(12) United States Patent
Zhou et al.

(10) Patent No.: US 12,672,095 B2
(45) Date of Patent: Jun. 30, 2026

(54) DATA PROCESSING METHOD AND APPARATUS

(71) Applicant: HUAWEI TECHNOLOGIES CO., LTD., Shenzhen (CN)

(72) Inventors: Caifa Zhou, Wuhan (CN); Yongliang Wang, Xi'an (CN); Dandan Zeng, Beijing (CN); Zhi Li, Xi'an (CN); Longhai Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 18/342,077

(22) Filed: Jun. 27, 2023

(65) Prior Publication Data

US 2023/0354258 A1　　Nov. 2, 2023

Related U.S. Application Data

(63) Continuation of application No. PCT/CN2021/142268, filed on Dec. 29, 2021.

(30) Foreign Application Priority Data

Dec. 29, 2020　(CN) .......................... 202011602647.3

(51) Int. Cl.
*H04W 64/00* (2009.01)
*G01H 9/00* (2006.01)
*G01N 21/65* (2006.01)

(52) U.S. Cl.
CPC .......... *H04W 64/003* (2013.01); *G01H 9/004* (2013.01); *G01N 21/65* (2013.01)

(58) Field of Classification Search
None
See application file for complete search history.

(56) References Cited

U.S. PATENT DOCUMENTS 10,075,818 B2　9/2018 Le Grand et al.
2013/0317944 A1* 11/2013 Huang ................ G01S 5/02521
455/457

(Continued)

FOREIGN PATENT DOCUMENTS

CN　　102253365 A　　11/2011
CN　　104813185 B　　2/2018

*Primary Examiner* — German Viana Di Prisco
(74) *Attorney, Agent, or Firm* — Rimon PC

(57) ABSTRACT

A data processing method is provided, the method including: obtaining crowd-sourced data, where each instance of the crowd-sourced data includes first location information of a terminal at a location point and received radio signal information, the location point is within a preset area, and the first location information indicates a relative location of the location point with respect to a preset location point; obtaining, based on the crowd-sourced data, a plurality of first similarities and a second similarity corresponding to each first similarity; determining a target mapping relationship based on the plurality of first similarities and the second similarity corresponding to each first similarity; and obtaining a plurality of preset trajectories within the preset area, and performing trajectory fusion on the plurality of preset trajectories with the target mapping relationship as a constraint, to obtain a trajectory fusion result.

20 Claims, 11 Drawing Sheets

(56) References Cited

U.S. PATENT DOCUMENTS

| | | | | |
|---|---|---|---|---|
| 2014/0378166 A1* | 12/2014 | Hong | .................... | H04W 4/023 |
| | | | | 455/456.3 |
| 2015/0204676 A1* | 7/2015 | Zhang | ................... | G01S 5/0294 |
| | | | | 701/410 |
| 2018/0077534 A1 | 3/2018 | Le Grand et al. | | |
| 2019/0373413 A1* | 12/2019 | Kong | ..................... | H04W 4/33 |
| 2021/0390469 A1* | 12/2021 | Xiao | ....................... | H04W 4/80 |
| 2021/0405643 A1* | 12/2021 | Kypris | .............. | G01C 21/3461 |
| 2022/0167116 A1* | 5/2022 | Volotinen | ............. | H04W 4/029 |

* cited by examiner

Obtain a plurality of pieces of crowd-sourced data, where each piece of the crowd-sourced data includes first location information of a terminal at a location point and received radio signal information, the location point is within a preset area, and the first location information indicates a relative location of the location point with respect to a preset location point — 301

Obtain, based on the plurality of pieces of crowd-sourced data, a plurality of first similarities and a second similarity corresponding to each first similarity, where each first similarity is used to represent a signal similarity of radio signal information included in every two pieces of the crowd-sourced data, and each second similarity is used to represent a location similarity of first location information included in every two pieces of the crowd-sourced data — 302

Determine a target mapping relationship based on the plurality of first similarities and the second similarity corresponding to each first similarity, where the target mapping relationship includes a mapping relationship between a similarity of first location information corresponding to different locations of the terminal and the similarity of the received radio signal information, and a level of uncertainty of the mapping relationship — 303

Obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area — 304

FIG. 3

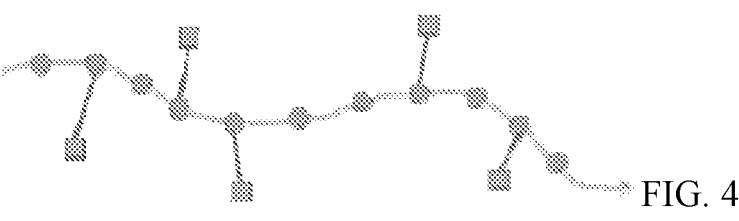

FIG. 4

Data processing apparatus
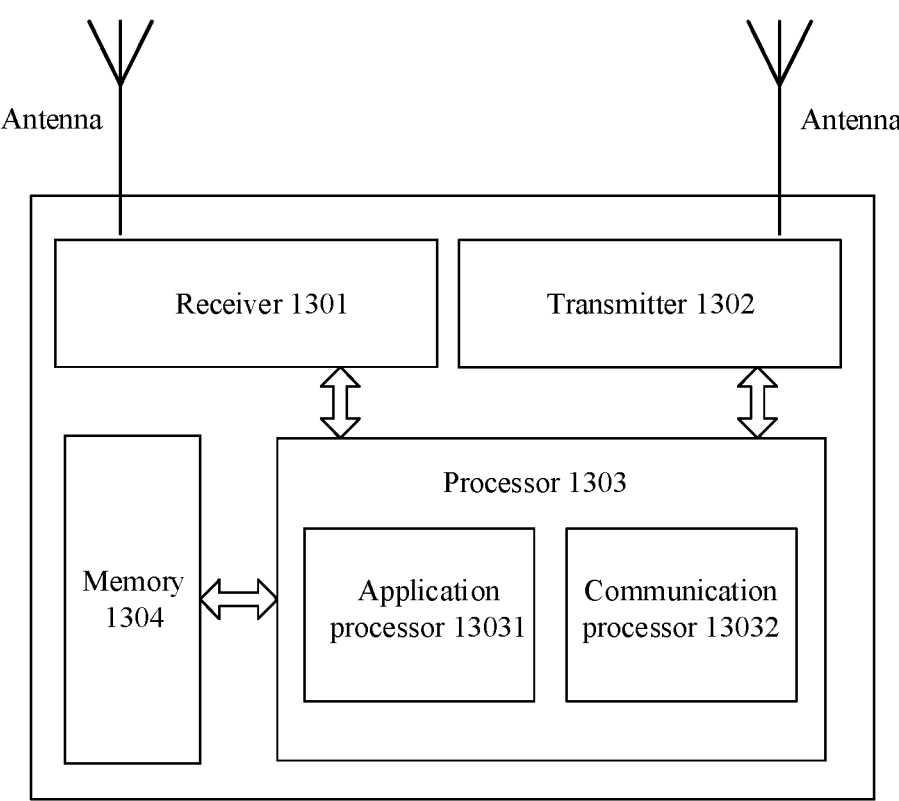
FIG. 13

DATA PROCESSING METHOD AND APPARATUS

CROSS-REFERENCE TO RELATED APPLICATIONS

This application is a continuation of International Application No. PCT/CN2021/142268, filed on Dec. 29, 2021, which claims priority to Chinese Patent Application No. 202011602647.3, filed on Dec. 29, 2020. The disclosures of the aforementioned applications are hereby incorporated by reference in their entireties.

TECHNICAL FIELD

This application relates to the field of artificial intelligence, and in particular, to a data processing method and apparatus.

BACKGROUND

The popularization of mobile devices and the development of mobile communication technologies provide different possibilities for implementing positioning and navigation. Taking positioning as an example, a chip integrated into a mobile device may be configured to provide a precise outdoor positioning service for a user. Satellite-based outdoor positioning and navigation can already satisfy various outdoor travel requirements of users. However, due to obstacles such as buildings, a positioning technology based on receiving a satellite signal cannot provide an available positioning service indoors. According to existing indoor positioning solutions, available features or signals that are ubiquitous include a visual image, a photoacoustic signal, a geomagnetic field, a radio signal from a mobile base station, Wi-Fi, Bluetooth, or the like. As a method for providing an indoor positioning service with low costs and high availability, indoor positioning based on radio signal feature matching is one of the most promising solutions.

The method for performing indoor positioning based on radio signal feature matching includes two key steps. One is to perform modeling based on a measurable radio signal in an indoor area, where a model that is built may include a mapping relationship between location information of each location point in the indoor area and radio signal information. The other is to estimate a location of a user based on the radio signal information measured by a mobile terminal used by the user.

However, at present, in an implementation of radio signal-based modeling, crowd-sourced data (including an absolute location of a location point and radio signal information) collected by a terminal device in an indoor place is used as a training input, to obtain a radio signal-based model through training based on a large amount of data. However, the crowd-sourced data includes the absolute location of the location point, and a propagation model of each radio signal source is fitted by using the absolute location of the location point. Due to limited precision of a sensor carried on the terminal device, the obtained absolute location is not highly precise, and as a result, positioning precision of a model that is built is affected.

SUMMARY

According to a first aspect, this application provides a data processing method. The method includes:

obtaining crowd-sourced data, where each instance of the crowd-sourced data includes first location information of a terminal at a location point and received radio signal information, the location point is within a preset area, and the first location information indicates a relative location of the location point with respect to a preset location point.

For radio signal-based modeling for a specific indoor area (referred to as a preset area in this embodiment), a server may receive crowd-sourced data that is collected by a terminal device within the preset area and that is sent by the terminal device. Specifically, the crowd-sourced data may be data collected by the same terminal device at different moments, or the crowd-sourced data may be data collected by different terminal devices at a same moment or at different moments.

The terminal device may move along a terminal motion trajectory. The motion trajectory includes a plurality of location points. The terminal device may collect first location information and radio signal information at each location point. The first location information is obtained based on data collected by an inertial measurement unit (IMU). Specifically, the data collected by the IMU may be processed (for example, with double-integral processing and processing based on a deep learning model) to obtain a continuous motion trajectory of a user. The first location information is a location of a first location point on the continuous motion trajectory relative to a preset location. The first location information may alternatively be obtained by visual-inertial odometry (VIO) integrated on a terminal device side.

The preset location point may be a start point of the terminal motion trajectory, a location point on the terminal motion trajectory at an adjacent previous moment, or a preceding location point on the terminal motion trajectory at a non-adjacent moment. This is not limited in this application. For example, the terminal motion trajectory may include a location point A, a location point B, and a location point C. The location point A, the location point B, and the location point C are location points at sequentially adjacent moments. The location point B is a location point adjacent to the location point C at a previous moment, and the location point A is a location point before the location point C at a non-adjacent moment.

The radio signal information may be obtained by using an existing radio signal chip on the terminal device side over a system layer data measurement port thereof. For example, data from a Wi-Fi access point, a Bluetooth beacon, or a mobile base station may be obtained. In this embodiment, the radio signal information may also be referred to as access point parameter information, and may specifically refer to an identifier of each radio signal source detected by the terminal device at a specific location point, and a feature parameter of a signal from each radio signal source.

The method further includes: obtaining, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data.

The server may combine crowd-sourced data from a same terminal motion trajectory in pairs, to create a plurality of location-signal pairs and calculate a location similarity of first location information and a signal similarity of radio signal information included in each location-signal pair.

The method further includes: determining a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship.

The plurality of first similarities may be distributed in M similarity ranges. Each similarity range includes a plurality of first similarities, and second similarities corresponding to the plurality of first similarities in each similarity range satisfy Rayleigh distribution. The server may obtain a Rayleigh distribution parameter of a Rayleigh distribution satisfied by the second similarities corresponding to the plurality of first similarities in each of the M similarity ranges. The Rayleigh distribution parameter indicates a maximum likelihood estimation (MLE) result of the second similarities corresponding to the plurality of first similarities in the similarity ranges; and determine the target mapping relationship based on M Rayleigh distribution parameters through continuous function estimation. The level of uncertainty may indicate a weight, in a constraint, of a determined location similarity of first location information of two location points. The constraint may be used for subsequent trajectory fusion, and the constraint may be used to represent a distance constraint in a location similarity of the two location points when a similarity of radio signal information of the two location points is determined. Specifically, a location transformation relationship between a plurality of trajectories may be calculated through non-linear optimization, to minimize a loss function value of the constraint (including the location similarity determined based on the target mapping relationship), thereby implementing trajectory fusion. For example, a trajectory A includes a location point A, and a trajectory B includes a location point B. Based on a similarity of radio signal information of the location point A and radio signal information of the location point B, a location similarity of the location point A and the location point B may be determined based on the target mapping relationship. If a level of uncertainty corresponding to the location similarity is relatively large, a weight of a location constraint corresponding to the location similarity accounts for a relatively large proportion when trajectory fusion is performed. If a level of uncertainty corresponding to the location similarity is relatively small, a weight of a location constraint corresponding to the location similarity accounts for a relatively small proportion when trajectory fusion is performed. The method further includes: obtaining a plurality of preset trajectories within the preset area, and performing trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area.

Trajectory fusion is a process of unifying and aligning coordinates of preset trajectories in a plurality of different coordinate systems. The preset trajectories are objects of trajectory fusion, and the preset trajectories are trajectories expressed in the various local coordinate systems. In this embodiment, the preset trajectories are also referred to as relative trajectories, preset motion trajectories, or preset movement trajectories. The trajectory fusion solution based on a radio signal is to build a plurality of types of geometric constraints between the plurality of trajectories based on geometric constraint-based modeling. The geometric constraints may include the target mapping relationship and a relative location constraint.

During trajectory fusion, the server may calculate the location transformation relationship between the plurality of trajectories through non-linear optimization, to minimize the loss function value of the given constraint (including the target mapping relationship, and optionally, further including the relative location constraint), thereby implementing trajectory fusion.

The absolute location may also be referred to as a global location, that is, a specific location of the location point on a physical plane. A point within the preset area at which the terminal device is located may be determined based on the absolute location.

When the terminal device used by the user collects a group of radio signals within the preset area, the terminal device may match the group of radio signals with each instance of radio signal information in the trajectory fusion result (for example, perform matching according to a k-nearest neighbors algorithm), to calculate a location (the second location information) of the terminal device. The foregoing positioning process may be implemented on a terminal device on a terminal side or a server on a cloud side. If the positioning process is implemented on the terminal device on the terminal side, the terminal device may obtain first radio signal information within the preset area, and determine location information of the terminal device based on the first radio signal information and the trajectory fusion result. If the implementation is on the server on the cloud side, the server may obtain first radio signal information within the preset area that is collected by the terminal device and that is sent by the terminal device, and determine location information of the terminal device based on the first radio signal information and the trajectory fusion result.

In the foregoing manner, the crowd-sourced data is combined to create relative location-signal pairs, and a geometric constraint (that is, the target mapping relationship in this embodiment) is built based on the relative location information and the radio signal information, so that a radio signal-based model (that is, the trajectory fusion result in this embodiment) can be determined based on the crowd-sourced data without relying on absolute location information, thereby improving positioning precision of the radio signal-based model.

In a possible implementation, the crowd-sourced data includes data of a location point on a same terminal motion trajectory. The crowd-sourced data are the data on the location points on the same terminal motion trajectory. To be specific, the first location information included in each instance of the crowd-sourced data in the crowd-sourced data is a relative location of each location point on the same motion trajectory relative to the preset location point.

In a possible implementation, the plurality of first similarities are distributed in M similarity ranges, each similarity range includes a plurality of first similarities, second similarities corresponding to the plurality of first similarities in each similarity range satisfy a Rayleigh distribution, and determining a target mapping relationship based on the plurality of first similarities and the second similarity corresponding to each first similarity includes: obtaining a Rayleigh distribution parameter of the Rayleigh distribution satisfied by the second similarities corresponding to the plurality of first similarities in each of the M similarity ranges, where the Rayleigh distribution parameter indicates a maximum likelihood estimation result of the second similarities corresponding to the plurality of first similarities in the similarity ranges. The server may divide value ranges of the similarities into several similarity ranges, and sort a relative location similarity and signal similarity of a location-signal pair that falls within a corresponding similarity range into the corresponding range. Based on the distance (the second similarity) that falls within each similarity range, a distribution may be assumed, and one distribution that may be used for fitting these distances is the Rayleigh distribution (as shown in FIG. 6). With the assumption of a Rayleigh distribution, the maximum likelihood estimation (MLE) may be performed based on the distance in the similarity range, to calculate the Rayleigh distribution parameter.

The following is further included: determining the target mapping relationship based on M Rayleigh distribution parameters through continuous function estimation.

The continuous function estimation refers to determining a continuous function mapping relationship based on an original discrete data correspondence. The function mapping relationship may fit the original discrete data correspondence.

In this embodiment, it is assumed that the distribution of distances in a similarity range is a Rayleigh distribution, and a distribution parameter is estimated, to estimate a radio signal similarity, a distance similarity, and a level of uncertainty thereof.

In a possible implementation, the Rayleigh distribution parameter is obtained according to the following formula:

$$\hat{\sigma} = \sqrt{\frac{1}{n}\Sigma_i d_i^2 / 2}$$

$\hat{\sigma}$ represents the Rayleigh distribution parameter, $d_i$ represents the second similarity, and n represents a quantity of the first similarities included in each similarity range.

In a possible implementation, determining the target mapping relationship based on M Rayleigh distribution parameters through continuous function estimation includes: determining, based on the M Rayleigh distribution parameters, an estimated geometric distance in a similarity range corresponding to each Rayleigh distribution parameter; and determining, through continuous function estimation, the target mapping relationship based on M estimated geometric distances and a similarity range corresponding to each estimated geometric distance.

In a possible implementation, the radio signal information includes an identifier of a radio signal source transmitting a radio signal and signal strength information of the radio signal, and the second similarity includes a similarity of identifiers of radio signal sources transmitting radio signals and a similarity of signal strength information of the radio signals. The radio signal information may be obtained by using the existing radio signal chip on the terminal device side over the system layer data measurement port thereof. For example, data from a Wi-Fi access point, a Bluetooth beacon, or a mobile base station may be obtained. In this embodiment, the radio signal information may also be referred to as access point parameter information, and may specifically refer to an identifier of each radio signal source detected by the terminal device at a specific location point, and a feature parameter of a signal from each radio signal source. For example, the radio signal source may be an access point (AP) of a wireless local area network (WLAN). The identifier of the radio signal source may be a media access control (MAC) address of the AP. The feature parameter of the signal from the radio signal source may be a received signal strength indication (RSSI). The radio signal source may include but is not limited to a short-range wireless communication signal source, for example, an access point (AP) or Bluetooth signal source. The AP may be specifically a wireless router, a mobile phone hotspot, or the like. This is not limited in this embodiment of this application. Each AP has a unique Wi-Fi identifier, and the Wi-Fi identifier may be a service set identifier (SSID) or a Wi-Fi name. The Wi-Fi identifier may further include the MAC address of the AP, the RSSI, and the like.

In a possible implementation, the first similarity is obtained according to the following formula:

$$g(O_i, O_j) = \frac{(1 + \beta^2)g_1(O_i, O_j)g_2(O_i, O_j)}{\beta^2 g_1(O_i, O_j) + g_2(O_i, O_j)}$$

$\beta$ is a weight of a preset value, $g_1(O_i, O_j)$ is used to represent the similarity of the identifiers of the radio signal sources transmitting the radio signals, and $g_2(O_i, O_j)$ is used to represent the similarity of the signal strength information of the radio signals. The server may calculate the signal similarity of the radio signal information based on measurability and the signal strength information of the radio signal. For example, a radio signal O may be represented as a unique identifier (for example, a media access control MAC address) and a signal strength of a measurable signal, that is, $$O = \{(a_k : v_k)\}_{k=1}^{|O|}.$$

|O| represents a quantity of signal sources in the radio signal measurement. Unique identifiers of all measurable radio signals included in the radio signal O are represented as A. When the similarity of the radio signal information is calculated, both the measurability and the signal strength information of the radio signal may be considered.

In a possible implementation, the method further includes:

obtaining the first radio signal information of the terminal device within the preset area; and determining the location information of the terminal device based on the first radio signal information and the trajectory fusion result, where the first radio signal information is most similar to target radio signal information in the trajectory fusion result, and in the trajectory fusion result, the target radio signal information corresponds to the location information of the terminal device.

The trajectory fusion result may be used to locate the terminal device. The server may obtain the first radio signal information of the terminal device within the preset area, and determine the location information of the terminal device based on the first radio signal information and the trajectory fusion result. The first radio signal information is most similar to the target radio signal information in the trajectory fusion result, and in the trajectory fusion result, the target radio signal information corresponds to the location information of the terminal device.

Specifically, when the terminal device used by the user collects a group of radio signals within the preset area, the terminal device may match the group of radio signals with each instance of radio signal information in the trajectory fusion result (for example, perform matching according to a k-nearest neighbors algorithm), to calculate a location (the second location information) of the terminal device. The foregoing positioning process may be implemented on a terminal device on a terminal side or a server on a cloud side. If the positioning process is implemented on the terminal device on the terminal side, the terminal device may obtain first radio signal information within the preset area, and determine location information of the terminal device based on the first radio signal information and the trajectory fusion result. If the implementation is on the server on the cloud side, the server may obtain first radio signal information within the preset area that is collected by the terminal device and that is sent by the terminal device, and determine location information of the terminal device based on the first radio signal information and the trajectory fusion result.

According to a second aspect, this application provides a data processing apparatus. The apparatus includes:

an obtaining module, configured to obtain crowd-sourced data, where each instance of the crowd-sourced data includes first location information of a terminal at a location point and received radio signal information, the location point is within a preset area, and the first location information indicates a relative location of the location point with respect to a preset location point;

a similarity determining module, configured to obtain, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data;

a mapping relationship determining module, configured to determine a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship; and a trajectory fusion module, configured to: obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area.

In a possible implementation, the crowd-sourced data are data of a location point on a same terminal motion trajectory.

In a possible implementation, the plurality of first similarities are distributed in M similarity ranges, each similarity range includes a plurality of first similarities, second similarities corresponding to the plurality of first similarities in each similarity range satisfy a Rayleigh distribution, and the mapping relationship determining module is configured to:

obtain a Rayleigh distribution parameter of the Rayleigh distribution satisfied by the second similarities corresponding to the plurality of first similarities in each of the M similarity ranges, where the Rayleigh distribution parameter indicates a maximum likelihood estimation result of the second similarities corresponding to the plurality of first similarities in the similarity ranges; and determine the target mapping relationship based on M Rayleigh distribution parameters through continuous function estimation.

In a possible implementation, the Rayleigh distribution parameter is obtained according to the following formula:

$$\hat{\sigma} = \sqrt{\frac{1}{n}\Sigma_i d_i^2 / 2}$$

$\hat{\sigma}$ represents the Rayleigh distribution parameter, $d_i$ represents the second similarity, and n represents a quantity of the first similarities included in each similarity range.

In a possible implementation, the mapping relationship determining module is configured to:

determine, based on the M Rayleigh distribution parameters, an estimated geometric distance in a similarity range corresponding to each Rayleigh distribution parameter; and determine, through continuous function estimation, the target mapping relationship based on M estimated geometric distances and a similarity range corresponding to each estimated geometric distance.

In a possible implementation, the radio signal information includes an identifier of a radio signal source transmitting a radio signal and signal strength information of the radio signal, and the second similarity includes a similarity of identifiers of radio signal sources transmitting radio signals and a similarity of signal strength information of the radio signals.

In a possible implementation, the first similarity is obtained according to the following formula:

$$g(O_i, O_j) = \frac{(1+\beta^2)g_1(O_i, O_j)g_2(O_i, O_j)}{\beta^2 g_1(O_i, O_j) + g_2(O_i, O_j)}$$

$\beta$ is a weight of a preset value, $g_1(O_i, O_j)$ is used to represent the similarity of the identifiers of the radio signal sources transmitting the radio signals, and $g_2(O_i, O_j)$ is used to represent the similarity of the signal strength information of the radio signals.

In a possible implementation, the apparatus further includes:

a positioning module, configured to: obtain first radio signal information of a terminal device within the preset area; and determine location information of the terminal device based on the first radio signal information and the trajectory fusion result, where the first radio signal information is most similar to target radio signal information in the trajectory fusion result, and in the trajectory fusion result, the target radio signal information corresponds to the location information of the terminal device.

According to a third aspect, an embodiment of this application provides a data processing apparatus. The apparatus may include a memory, a processor, and a bus system. The memory is configured to store a program, and the processor is configured to execute the program in the memory, to perform the first aspect and any optional method according to the first aspect.

According to a fourth aspect, an embodiment of this application provides a computer-readable storage medium. The computer-readable storage medium stores a computer program, and when the computer program is run on a computer, the computer is enabled to perform the first aspect and any optional method according to the first aspect.

According to a fifth aspect, an embodiment of this application provides a computer program product. The computer program product includes code, and when the code is executed, the first aspect and any optional method according to the first aspect are implemented.

According to a sixth aspect, this application provides a chip system. The chip system includes a processor, configured to support an execution device or a training device to implement functions in the foregoing aspects, for example, send or process data or information in the foregoing method. In a possible design, the chip system further includes a memory. The memory is configured to store a program instruction and data that are necessary for the execution device or the training device. The chip system may include a chip, or may include a chip and another discrete device.

An embodiment of this application provides a data processing method. The method includes: obtaining a crowd-sourced data, where each instance of the crowd-sourced data includes first location information of a terminal at a location point and received radio signal information, the location point is within a preset area, and the first location information indicates a relative location of the location point with respect to a preset location point; obtaining, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data; determining a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship; and obtaining a plurality of preset trajectories within the preset area, and performing trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area. In the foregoing manner, the crowd-sourced data is combined to create relative location-signal pairs, and a geometric constraint (that is, the target mapping relationship in this embodiment) is built based on the relative location information and the radio signal information, so that a radio signal-based model (that is, the trajectory fusion result in this embodiment) can be determined based on the crowd-sourced data without relying on absolute location information, thereby improving positioning precision of the radio signal-based model.

BRIEF DESCRIPTION OF DRAWINGS

FIG. 3 is a schematic flowchart of a data processing method according to an embodiment of this application;

FIG. 4 is a schematic diagram of a terminal motion trajectory according to an embodiment of this application;

FIG. 13 is a schematic diagram of a structure of a data processing apparatus according to an embodiment of this application.

DESCRIPTION OF EMBODIMENTS

Embodiments of the present invention are described below with reference to the accompanying drawings in embodiments of the present invention. Terms used in implementations of the present invention are merely intended to explain specific embodiments of the present invention, but not intended to limit the present invention.

Embodiments of this application are described below with reference to the accompanying drawings. A person of ordinary skill in the art can understand that, with the development of technologies and the emergence of new scenarios, technical solutions provided in embodiments of this application are also applicable to a similar technical problem.

The terms "first", "second", and the like in the description, the claims, and the accompanying drawings of this application are used to distinguish between similar objects, and are not necessarily intended to describe a specific order or sequence. It should be understood that the terms used in such a way are interchangeable in proper circumstances, and this is merely a manner of discrimination for describing objects having a same attribute in embodiments of this application. In addition, the terms "include", "contain", and any other variants thereof are intended to cover non-exclusive inclusion, so that a process, method, system, product, or device that includes a series of units is not necessarily limited to those units, but may include another unit not expressly listed or not inherent to such a process, method, system, product, or device.

Figure 1:
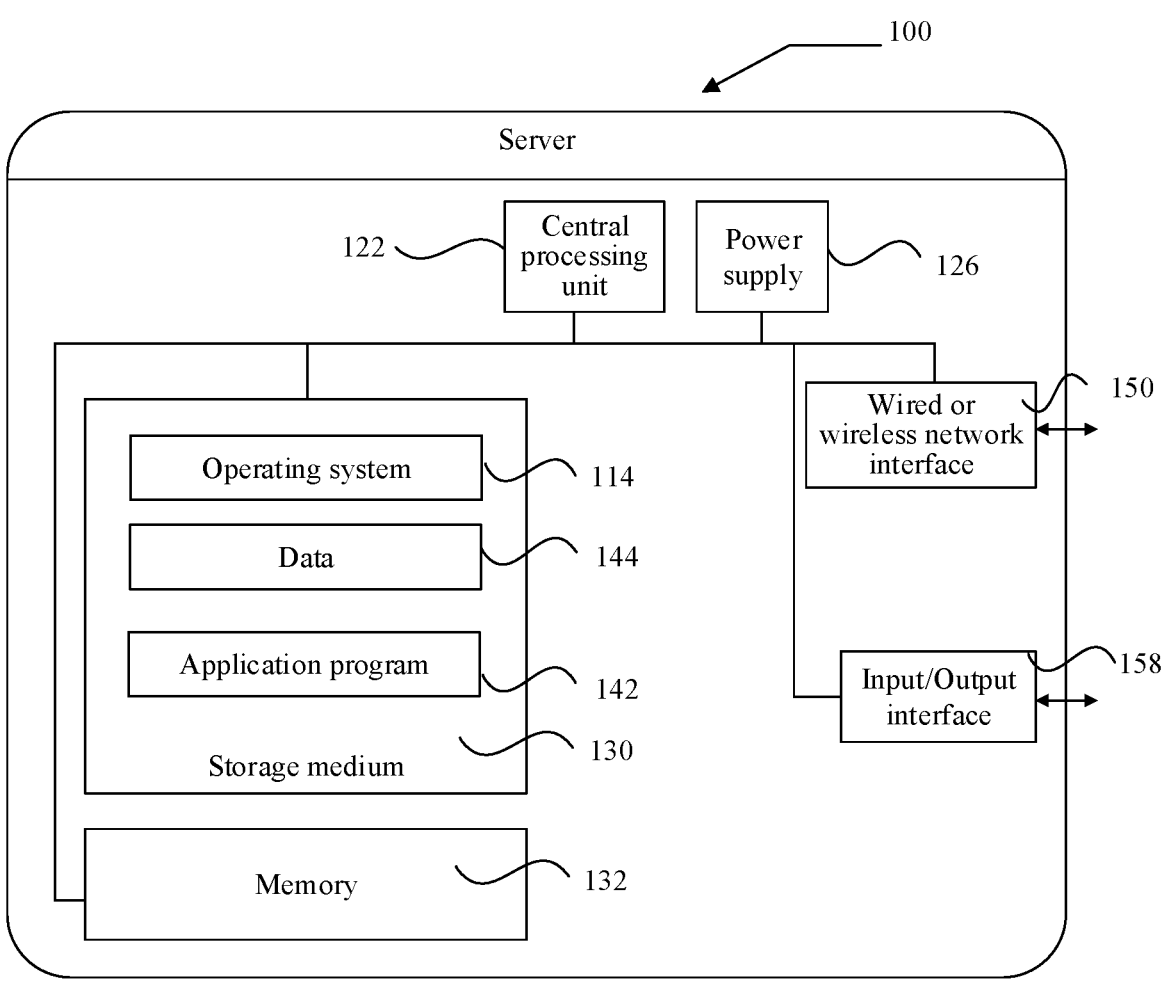
FIG. 1 is a schematic diagram of a structure of a server according to an embodiment of this application.

A method according to embodiments of this application is applied to one or more data processing apparatuses. The data processing apparatus may be a terminal or a server, and processes of obtaining data, training data, and determining based on data fusion are implemented by using software and/or hardware. A server is used as an example. FIG. 1 is a schematic diagram of a structure of a server according to an embodiment of this application. Steps performed by the server in this embodiment of this application may be performed based on the server structure shown in FIG. 1.

The server 100 may vary greatly due to different configurations or performance, and may include one or more central processing units (CPUs) 122 (for example, one or more processors), a memory 132, and one or more storage media 130 that store an application program 142 or data 144 (for example, one or more mass storage devices). The memory 132 and the storage medium 130 may be volatile storages or non-volatile storages. The program stored in the storage medium 130 may include one or more modules (not shown in the figure), and each module may include a series of instruction operations for the server. Further, the central processing unit 122 may be set for communication with the storage medium 130, and executes, on the server 100, the series of instruction operations in the storage medium 130.

The server 100 may further include one or more power supplies 126, one or more wired or wireless network interfaces 150, one or more input/output interfaces 158, and/or one or more operating systems 141, for example, Windows Server™, Mac OS X™, Linux™, and FreeBSD™.

In this embodiment of this application, the CPU 122 may obtain code in the storage medium 130, to perform a data processing method provided in embodiments of this application.

First, some concepts used in embodiments of this application are described.

(1) Crowd-sourced data refers to available data, for example, a sensor signal, a radio frequency signal, and a network signal, of an intelligent terminal used by a user that is collected based on a specific triggering mechanism without user perception.

(2) Access point parameter information refers to an identifier of each radio signal source detected by an electronic device at a specific geographic location, and a feature parameter of a signal from each radio signal source. For example, the radio signal source may be an access point (AP) of a wireless local area network (WLAN). The identifier of the radio signal source may be a media access control (MAC) address of the AP. The feature parameter of the signal from the radio signal source may be a received signal strength indication (RSSI).

(3) A radio signal source may be a short-range wireless communication signal source, for example, an access point (AP) or Bluetooth signal source. The AP may be specifically a wireless router, a mobile phone hotspot, or the like. This is not limited in this embodiment of this application. Each AP has a unique Wi-Fi identifier, and the Wi-Fi identifier may be a service set identifier (SSID) or a Wi-Fi name. The Wi-Fi identifier may further include the MAC address of the AP, the RSSI, and the like.

Figure 2:
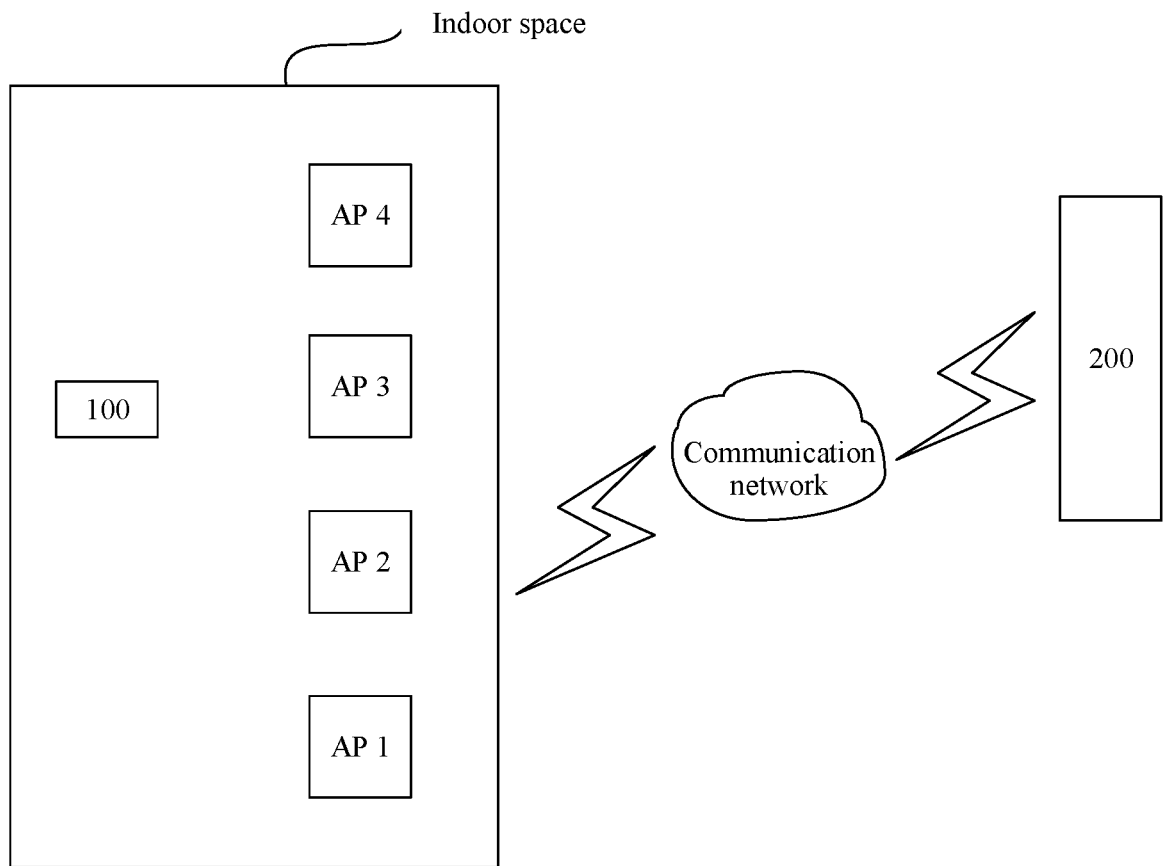
FIG. 2 is a schematic diagram of an application architecture according to an embodiment of this application.

FIG. 2 is a schematic diagram of an indoor positioning scenario architecture. The scenario architecture includes a terminal device 100 and a server 200 that are in an indoor space and a plurality of radio signal sources (for example, an AP 1, an AP 2, an AP 3, and an AP 4) that are located at different floors in the indoor space. The terminal device 100 and the server 200 may communicate with each other by using a communication network. For example, the indoor space in FIG. 2 is a building, and the AP 1, the AP 2, the AP 3, and the AP 4 are located on different floors. The server 200 may be one server, a server cluster including several servers, or a cloud server.

The communication network may be a local area network, may be a wide area network relayed by using a relay device, or may include both a local area network and a wide area network. When the communication network is a local area network, for example, the communication network may be a short-range communication network, for example, a Wi-Fi hotspot network, a Wi-Fi P2P network, a Bluetooth network, a ZigBee network, or a near-field communication (NFC) network. When the communication network is a wide area network, for example, the communication network may be a third-generation mobile communication technology (3G) network, a fourth-generation mobile communication technology (4G) network, a fifth-generation mobile communication technology (5G) network, a future-evolved public land mobile network (PLMN), or the Internet.

FIG. 3 is a schematic diagram of an embodiment of a data processing method according to an embodiment of this application. The data processing method provided in this embodiment of this application may be applied to a server or a terminal device. As shown in FIG. 3, the data processing method provided in this embodiment of this application includes the following steps.

301: Obtain crowd-sourced data, where each instance of the crowd-sourced data includes first location information of a terminal at a location point and received radio signal information, the location point is within a preset area, and the first location information indicates a relative location of the location point with respect to a preset location point.

In this embodiment of this application, for radio signal-based modeling for a specific indoor area (referred to as a preset area in this embodiment), a server may receive crowd-sourced data that is collected by a terminal device within the preset area and that is sent by the terminal device. Specifically, the crowd-sourced data may be data collected by the same terminal device at different moments, or the crowd-sourced data may be data collected by different terminal devices at a same moment or different moments.

In this embodiment of this application, the terminal device may move along a motion trajectory. The motion trajectory includes a plurality of location points. The terminal device may collect first location information and radio signal information at each location point. The first location information is obtained based on data collected by an inertial measurement unit (IMU). Specifically, the data collected by the IMU may be processed (for example, with double-integral processing and processing based on a deep learning model) to obtain a continuous motion trajectory of a user. The first location information is a location of a first location point on the continuous motion trajectory relative to a preset location. The first location information may alternatively be obtained by visual-inertial odometry (VIO) integrated on a terminal device side.

In this embodiment of this application, the first location information indicates the relative location between the location point and the preset location point. The crowd-sourced data are the data on the location points on the same terminal motion trajectory. To be specific, the first location information included in each instance of the crowd-sourced data in the crowd-sourced data is a relative location of each location point on the same motion trajectory relative to the preset location point. The preset location point may be a start point of the terminal motion trajectory, a location point on the terminal motion trajectory at an adjacent previous moment, or a preceding location point on the terminal motion trajectory at a non-adjacent previous moment. This is not limited in this application. For example, the terminal motion trajectory may include a location point A, a location point B, and a location point C. The location point A, the location point B, and the location point C are location points at sequentially adjacent moments. The location point B is a location point adjacent to the location point C at a previous moment, and the location point A is a location point before the location point C at a non-adjacent moment. This is not limited in this application.

It should be understood that the first location information may be represented as two-dimensional (with x and y coordinates) or three-dimensional (with x, y, and z coordinates). This is not limited in this application.

It should be understood that the server may further obtain crowd-sourced data on another terminal motion trajectory of the terminal device.

In this embodiment of this application, the radio signal information may be obtained by using an existing radio signal chip on a terminal device side over a system layer data measurement port thereof. For example, data from a Wi-Fi access point, a Bluetooth beacon, or a mobile base station may be obtained. In this embodiment, the radio signal information may also be referred to as access point parameter information, and may specifically refer to an identifier of each radio signal source detected by the terminal device at a specific location point, and a feature parameter of a signal from each radio signal source. For example, the radio signal source may be an access point (AP) of a wireless local area network (WLAN). The identifier of the radio signal source may be a media access control (MAC) address of the AP. The feature parameter of the signal from the radio signal source may be a received signal strength indication (RSSI). The radio signal source may include but is not limited to a short-range wireless communication signal source, for example, an access point (AP) or Bluetooth signal source. The AP may be specifically a wireless router, a mobile phone hotspot, or the like. This is not limited in this embodiment of this application. Each AP has a unique Wi-Fi identifier, and the Wi-Fi identifier may be a service set identifier (SSID) or a Wi-Fi name. The Wi-Fi identifier may further include the MAC address of the AP, the RSSI, and the like.

Because the first location information and the radio signal information are collected by different sensors, synchronous measurement is not implemented between the sensors. Therefore, the radio signal information may be aligned with corresponding first location information. This process may be completed by interpolating the relative location.

Further, the server may obtain a relative location (the first location information) and radio signal information of each location point on one terminal motion trajectory of a same terminal, that is, $$\{(p_i, O_i)\}_{i=1}^N.$$

$p_i$ represents the first location information, and $O_i$ represents the radio signal information. Similarly, the server may obtain crowd-sourced data on a plurality of terminal motion trajectories.

As shown in FIG. 4, one terminal motion trajectory may include a plurality of location points. At some of the location points (represented by circular marking signs in FIG. 4), first location information of some location points may be determined based on data obtained by a sensor, and first location information of some location points may be determined through interpolation. As shown in FIG. 4, radio signal information (a corresponding radio signal source is represented by a square marking sign in FIG. 4) may be further obtained. For example, in FIG. 4, five instances of crowd-sourced data may be obtained.

302: Obtain, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data.

In this embodiment of this application, after obtaining the crowd-sourced data, the server may obtain, based on the crowd-sourced data, the plurality of first similarities and the second similarity corresponding to each first similarity. Each first similarity is used to represent the signal similarity of the radio signal information included in every two instances of the crowd-sourced data, and each second similarity is used to represent the location similarity of the first location information included in every two instances of the crowd-sourced data.

Specifically, in this embodiment of this application, the server may combine crowd-sourced data from a same terminal motion trajectory in pairs, to create a plurality of location-signal pairs and calculate a location similarity of first location information and a signal similarity of radio signal information included in each location-signal pair.

How the server combines crowd-sourced data from the same terminal motion trajectory in pairs to create a plurality of location-signal pairs is described first below.

In this embodiment of this application, the server may combine crowd-sourced data (for example, represented as $$\{(p_i, O_i)\}_{i=1}^N)$$

from a same terminal motion trajectory in pairs (N instances of crowd-sourced data can create N(N−1)/2 pairs at most), to create a plurality of location-signal pairs [(p_i,O_i), (p_j,O_j)]. For example, the terminal motion trajectory shown in FIG. 4 includes five instances of crowd-sourced data, so that 10 location-signal pairs may be created by combining the crowd-sourced data in pairs.

Similarly, the server may combine crowd-sourced data on each terminal motion trajectory in pairs. For example, crowd-sourced data on K terminal motion trajectories may be collected and obtained from various terminals used by a plurality of users, and crowd-sourced data on each of the terminal motion trajectories is combined in pairs to obtain M·K location-signal pairs $$\{[(p_i, O_i), (p_j, O_j)]_l\}_{l=1}^{MK}.$$

These location-signal pairs may be used as samples for geometric constraint-based modeling, so that geometric constraint estimation can be performed without relying on absolute location information.

How the server calculates a location similarity of first location information and a signal similarity of radio signal information included in each location-signal pair is described first below.

In this embodiment of this application, the radio signal information may include an identifier of a radio signal source transmitting a radio signal and signal strength information of the radio signal. Correspondingly, the second similarity includes a similarity of identifiers of radio signal sources transmitting radio signals and a similarity of signal strength information of the radio signals.

In an implementation, the second similarity may be obtained according to the following formula:

$$g(O_i, O_j) = \frac{(1 + \beta^2)g_1(O_i, O_j)g_2(O_i, O_j)}{\beta^2 g_1(O_i, O_j) + g_2(O_i, O_j)}$$

$\beta$ is a weight of a preset value, $g_1(O_i, O_j)$ is used to represent the similarity of the identifiers of the radio signal sources transmitting the radio signals, and $g_2(O_i, O_j)$ is used to represent the similarity of the signal strength information of the radio signals.

Specifically, the server may calculate the signal similarity of the radio signal information based on measurability and the signal strength information of the radio signal. For example, a radio signal O may be represented as a unique identifier (for example, a media access control MAC address) and a signal strength of a measurable signal, that is, $$O = \{(a_k : v_k)\}_{k=1}^{|O|}.$$

|O|. |O| represents a quantity of signal sources in the radio signal measurement. Unique identifiers of all measurable radio signals included in the radio signal O are represented as A. When the similarity of the radio signal information is calculated, both the measurability and the signal strength information of the radio signal may be considered. A manner of implementing the similarity calculation is to obtain a geometric mean of the measurability and a similarity of the signal strength information, that is:

$$g(O_i, O_j) = \frac{(1 + \beta^2)g_1(O_i, O_j)g_2(O_i, O_j)}{\beta^2 g_1(O_i, O_j) + g_2(O_i, O_j)}$$

$\beta$ is a weighting factor and is used to equalize contributions of the signal measurability and the signal strength information to the similarity. $g_1(O_i, O_j)$ is used to represent a contribution of the signal measurability to the similarity, and may be calculated according to the following formula:

$$g_1(O_i, O_j) = \frac{|A_i \cap A_j|}{|A_i \cup A_j|}$$

In the foregoing formula, the numerator represents a quantity of measured signal sources in both of two groups of radio signal information in a location-signal pair, and the denominator represents a quantity of all measured signal sources in the two groups of radio signal information.

$g_2(O_i, O_j)$ is used to represent the similarity of the signal strength information of the measurable signal, and may be obtained through calculation according to the following formula:

$$g_2(O_i, O_j) = e^{\left(-\left(\frac{\Sigma_{a \in A_i \cap A_j}|v_i - v_j|}{|A_i \cap A_j|}\right)/2\tau^2\right)}$$

In this embodiment of this application, the location similarity of the first location information included in each location-signal pair may be defined as a Euclidean distance between two-dimensional or three-dimensional coordinates of physical locations, and may be specifically expressed by the following formula (using two-dimensional coordinates as an example):

$$d(p_i, p_j) = \sqrt{(x_i - x_j) + (g_i - y_j)}$$

Figure 5:
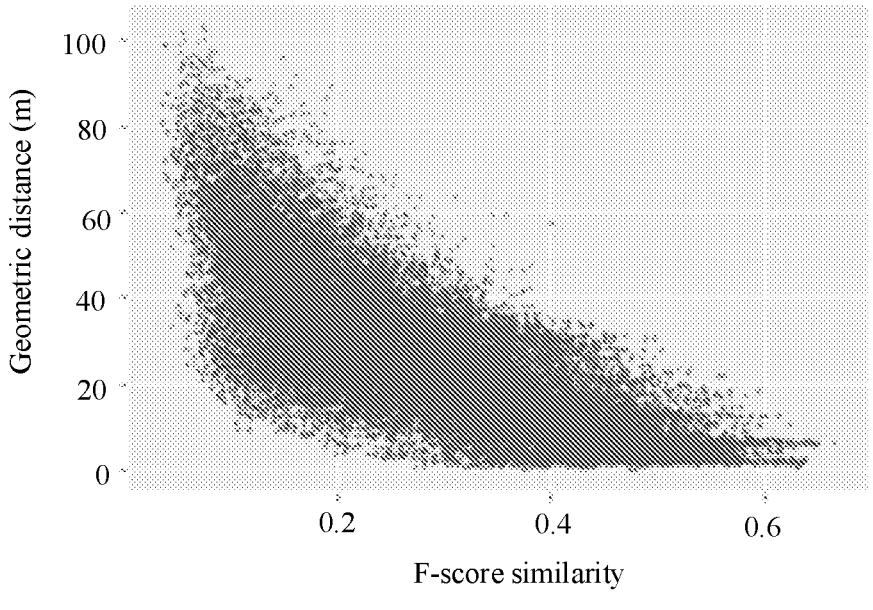
FIG. 5 is a schematic diagram of similarity distribution according to an embodiment of this application.

In this case, for every two instances of crowd-sourced data, one first similarity and one second similarity may be obtained. A group of similarities (including one first similarity and one second similarity) may be used as one coordinate point in a two-dimensional coordinate system, to obtain similarity distribution by using coordinate points at a time. For example, FIG. 5 is a schematic diagram of similarity distribution. A value range of the first similarity is [0, 1]. Qualitatively, the first similarity being closer to 0 indicates a longer distance between radio signals, and a weaker geometric constraint indicates a longer relative distance, so that the second similarity is smaller; and the first similarity being closer to 1 indicates a shorter distance between the radio signals, and a stronger geometric constraint indicates a shorter relative distance, so that the second similarity is larger. As the first similarity increases, a value of the second similarity gets lower (the second similarity represents a similarity of locations, and a larger location similarity indicates a shorter distance between relative locations).

303: Determine a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship.

In this embodiment of this application, after the plurality of first similarities and the second similarity corresponding to each first similarity are obtained based on the crowd-sourced data, the target mapping relationship may be determined based on the plurality of first similarities and the second similarity corresponding to each first similarity. The target mapping relationship includes the mapping relationship between a location similarity of first location information corresponding to different locations of the terminal and the signal similarity of the received radio signal information, and the level of uncertainty of the mapping relationship.

Specifically, in this embodiment, the plurality of first similarities may be distributed in M similarity ranges. Each similarity range includes a plurality of first similarities, and second similarities corresponding to the plurality of first similarities in each similarity range satisfy a Rayleigh distribution. The server may obtain a Rayleigh distribution parameter of the Rayleigh distribution satisfied by the second similarities corresponding to the plurality of first similarities in each of the M similarity ranges. The Rayleigh distribution parameter indicates a maximum likelihood estimation result of the second similarities corresponding to the plurality of first similarities in the similarity ranges; and determine the target mapping relationship based on M Rayleigh distribution parameters through continuous function estimation.

In an implementation, the Rayleigh distribution parameter may be obtained according to the following formula:

$$\hat{\sigma} = \sqrt{\frac{1}{n}\Sigma_i d_i^2/2}$$

$\hat{\sigma}$ represents the Rayleigh distribution parameter, $d_i$ represents the second similarity, and n represents a quantity of the first similarities included in each similarity range.

The server may determine, based on the M Rayleigh distribution parameters, an estimated geometric distance in a similarity range corresponding to each Rayleigh distribution parameter; and determine, through continuous function estimation, the target mapping relationship based on M estimated geometric distances and a similarity range corresponding to each estimated geometric distance.

Figure 6:
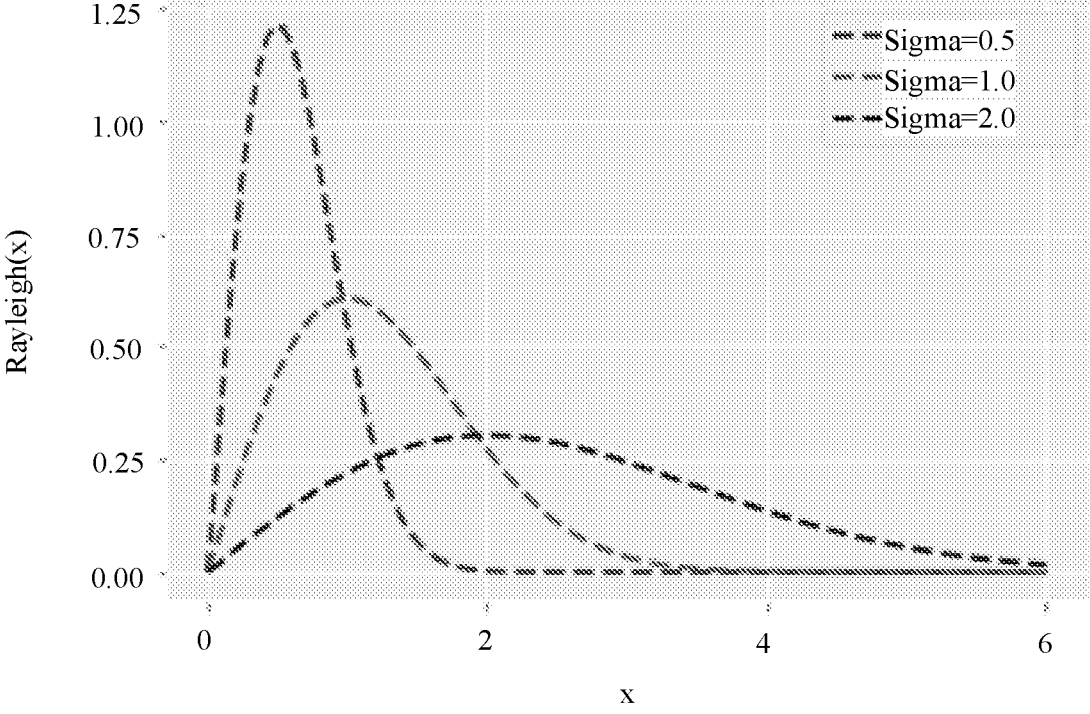
FIG. 6 is a schematic diagram of location similarity distribution according to an embodiment of this application.

In this embodiment of this application, the server may divide the value ranges of the similarities into several similarity ranges, and sort the relative location similarity and signal similarity of the location-signal pair that falls within the corresponding similarity range into the corresponding range. Based on the distance (the second similarity) that falls within each similarity range, a distribution may be assumed, and one distribution that may be used for fitting these distances is the Rayleigh distribution (as shown in FIG. 6). With the assumption of a Rayleigh distribution, the maximum likelihood estimation (MLE) may be performed based on the distance in the similarity range, to calculate the Rayleigh distribution parameter a:

$$\text{Rayleigh}(x, \sigma) = \frac{x}{\sigma^2}e^{-x^2/2\sigma^2}$$

It is assumed that a distance between n pairs of relative locations that fall within a similarity range $g_c$ is $$\{d_i\}_{i=1}^n,$$

and an estimation result of the MLE is:

$$\hat{\sigma} = \sqrt{\frac{1}{n}\Sigma_i d_i^2/2}$$

Based on a feature of the Rayleigh distribution, an expected geometric distance constraint and a level of uncertainty that correspond to the similarity range may be obtained through calculation based on the Rayleigh distribution parameter:

$$\mu_d = \hat{\sigma}\sqrt{\frac{\pi}{2}} \text{ ; and } \sigma_d^2 = \frac{4-\pi}{2}\hat{\sigma}^2$$

$\mu_d$ represents the expected geometric distance constraint, and $$\sigma_d^2$$

represents the level of uncertainty.

Figure 7:
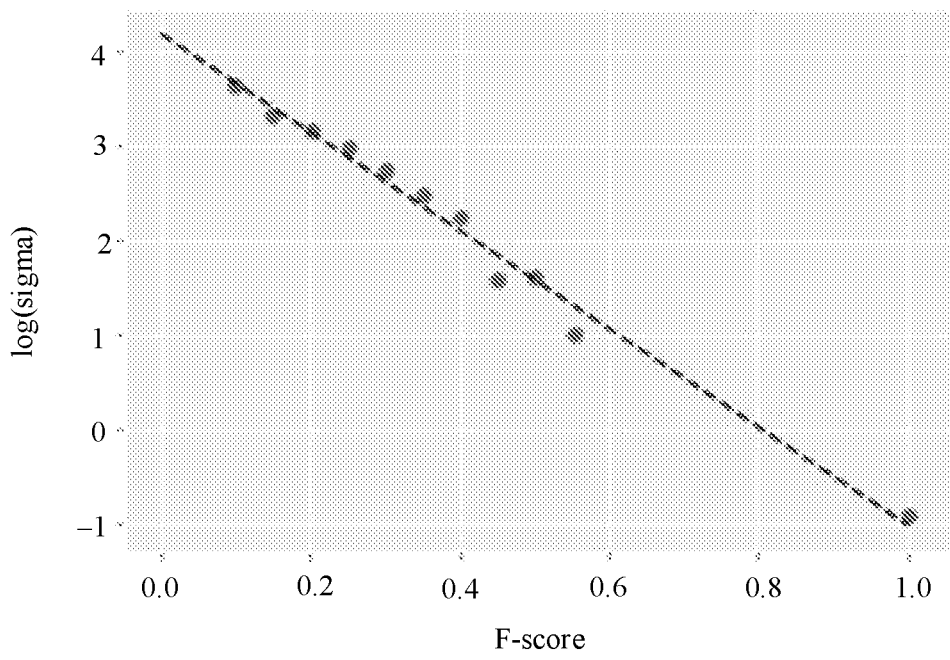
FIG. 7 is a schematic diagram of fitting a radio signal similarity and a distance similarity according to an embodiment of this application.
Figure 8:
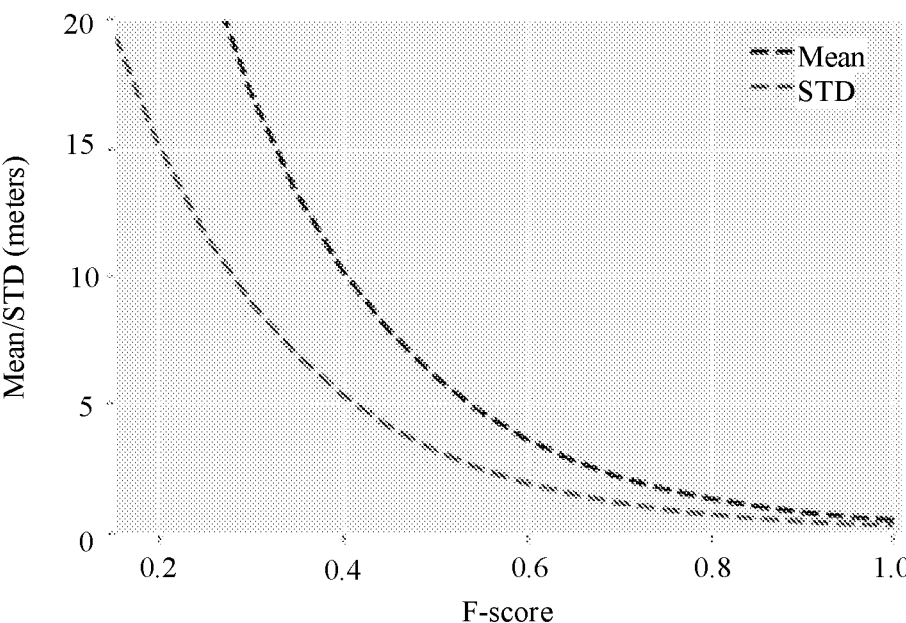
FIG. 8 is a schematic diagram of fitting a radio signal similarity and a distance similarity according to an embodiment of this application.

For example, the server may obtain a geometric constraint corresponding to each discrete similarity by dividing a similarity range and estimating a distribution parameter. To estimate a geometric constraint corresponding to any similarity, continuous function estimation is performed on a similarity range and a corresponding distribution parameter value. One method for the estimation is to assume that the similarity and the distribution parameter value satisfy a log-linear relationship (as shown in FIG. 7 and FIG. 8), that is:

$$\ln(\sigma)=f(g(O_i,O_j))=ag(O_i,O_j)+b$$

The parameters a and b in the foregoing formula may be obtained by performing least squares estimation based on an existing similarity range and a corresponding distribution parameter value. After the target mapping relationship in the foregoing formula is obtained, the expected geometric distance constraint and the level of uncertainty may be calculated.

304: Obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area.

In this embodiment of this application, after the target mapping relationship is determined based on the plurality of first similarities and the second similarity corresponding to each first similarity, the plurality of preset trajectories within the preset area may be obtained, and trajectory fusion is performed on the plurality of preset trajectories with the target mapping relationship as a constraint, to obtain the trajectory fusion result.

Figure 9:
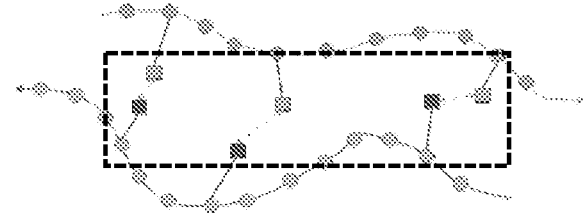
FIG. 9 is a schematic diagram of trajectory fusion according to an embodiment of this application.
Figure 10:
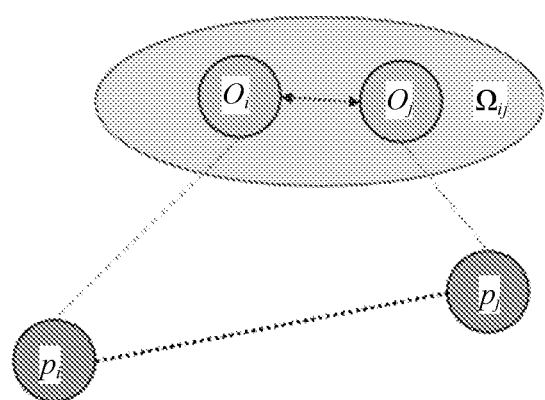
FIG. 10 is a schematic diagram of trajectory fusion according to an embodiment of this application.

In this embodiment of this application, the trajectory fusion is a process of unifying and aligning coordinates of preset trajectories in a plurality of different coordinate systems (for example, as shown in FIG. 9 and FIG. 10). The preset trajectories are objects of trajectory fusion, and the preset trajectories are trajectories expressed in the various local coordinate systems. In this embodiment, the preset trajectories are also referred to as relative trajectories, preset motion trajectories, or preset movement trajectories. The trajectory fusion solution based on a radio signal is to build a plurality of types of geometric constraints between the plurality of trajectories based on geometric constraint-based modeling. The geometric constraints may include the target mapping relationship obtained in step 303 and a relative location constraint.

The target mapping relationship includes the mapping relationship between a location similarity of first location information corresponding to different locations of the terminal and the signal similarity of the received radio signal information, and the level of uncertainty of the mapping relationship. When the trajectory fusion is performed, radio signal information of any two location points on a plurality of trajectories may be obtained, and a similarity of the radio signal information is calculated. A location similarity of first location information of the two location points and a level of uncertainty are determined based on the target mapping relationship. The level of uncertainty may represent a weight, in the constraint, of the determined location similarity of the first location information of the two location points. The constraint may be used for subsequent trajectory fusion, and the constraint may be used to represent a distance constraint in a location similarity of the two location points when a similarity of radio signal information of the two location points is determined. Specifically, a location transformation relationship between a plurality of trajectories may be calculated through non-linear optimization, to minimize a loss function value of the constraint (including the target mapping relationship, and optionally, further including the relative location constraint), thereby implementing trajectory fusion. For example, a trajectory A includes a location point A, and a trajectory B includes a location point B. Based on a similarity of radio signal information of the location point A and radio signal information of the location point B, a location similarity of the location A and the location B may be determined based on the target mapping relationship. If a level of uncertainty corresponding to the location similarity is relatively large, a weight of a location constraint corresponding to the location similarity accounts for a relatively large proportion when trajectory fusion is performed. If a level of uncertainty corresponding to the location similarity is relatively small, a weight of a location constraint corresponding to the location similarity accounts for a relatively small proportion when trajectory fusion is performed.

In addition, the relative location constraint refers to a distance and direction constraint between adjacent locations that is obtained by an IMU or a VIO, and the level of uncertainty is provided according to a relative location estimation algorithm (for example, double-integral) of the IMU or a VIO algorithm.

During the trajectory fusion, the server may calculate the location transformation relationship between the plurality of trajectories through non-linear optimization, to minimize the loss function value of the given constraint, thereby implementing trajectory fusion.

In this embodiment of this application, the trajectory fusion result may also be referred to as a radio signal-based model. The trajectory fusion result includes the second location information and the radio signal information of the plurality of location points within the preset area, and the second location information indicates the absolute locations of the location points within the preset area.

In this embodiment of this application, the trajectory fusion result may be used to locate the terminal device. The server may obtain the first radio signal information of the terminal device within the preset area, and determine the location information of the terminal device based on the first radio signal information and the trajectory fusion result. The first radio signal information is most similar to the target radio signal information in the trajectory fusion result, and in the trajectory fusion result, the target radio signal information corresponds to the location information of the terminal device.

Specifically, when the terminal device used by the user collects a group of radio signals within the preset area, the terminal device may match the group of radio signals with each instance of radio signal information in the trajectory fusion result (for example, perform matching according to a k-nearest neighbors algorithm), to calculate a location (the second location information) of the terminal device. The foregoing positioning process may be implemented on a terminal device on a terminal side or a server on a cloud side. If the positioning process is implemented on the terminal device on the terminal side, the terminal device may obtain first radio signal information within the preset area, and determine location information of the terminal device based on the first radio signal information and the trajectory fusion result. If the implementation is on the server on the cloud side, the server may obtain first radio signal information within the preset area that is collected by the terminal device and that is sent by the terminal device, and determine second location information of the terminal device based on the first radio signal information and the trajectory fusion result.

After the terminal device is located (that is, after the second location information of the terminal device is obtained through calculation), the server may send the second location information of the terminal device to the terminal device, so that the terminal device obtains a location of the terminal device.

It should be understood that, in an implementation, the server may alternatively directly send the trajectory fusion result to the terminal device, and the terminal device may calculate the second location information based on the trajectory fusion result. This is not limited in this embodiment.

It should be understood that the terminal device may further obtain a yaw angle, a pitch angle, and a roll angle of the terminal device, and implement a function that is related to augmented reality (AR) based on the second location information, the yaw angle, the pitch angle, and the roll angle. For example, indoor AR navigation may be performed. AR navigation refers to real-time navigation provided for a user based on visual information (for example, of a camera) obtained by a mobile terminal, with reference to a location estimation result. During indoor AR navigation, location estimation and trajectory optimization need to be performed in real time on a terminal side. The location estimation is implemented through indoor positioning, and provides location estimation and a level of uncertainty, to provide a geometric constraint. In addition, a changed relative location (in terms of distance and direction) is obtained by using the VIO. Based on the foregoing two constraints, a user trajectory is optimized in real time (for example, by using a non-linear optimizer). In this process, indoor AR navigation can be implemented without relying on visual positioning.

An embodiment of this application provides a data processing method. The method includes: obtaining crowd-sourced data, where each instance of the crowd-sourced data includes first location information of a terminal at a location point and received radio signal information, the location point is within a preset area, and the first location information indicates a relative location of the location point with respect to a preset location point; obtaining, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data; determining a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship; and obtaining a plurality of preset trajectories within the preset area, and performing trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area. In the foregoing manner, the crowd-sourced data is combined to create relative location-signal pairs, and a geometric constraint (that is, the target mapping relationship in this embodiment) is built based on the relative location information and the radio signal information, so that a radio signal-based model (that is, the trajectory fusion result in this embodiment) can be determined based on the crowd-sourced data without relying on absolute location information, thereby improving positioning precision of the radio signal-based model.

In addition, it is assumed that a distribution of distances in a similarity range is a Rayleigh distribution, and a distribution parameter is estimated, to estimate a radio signal similarity, a distance similarity, and a level of uncertainty thereof.

Figure 11:
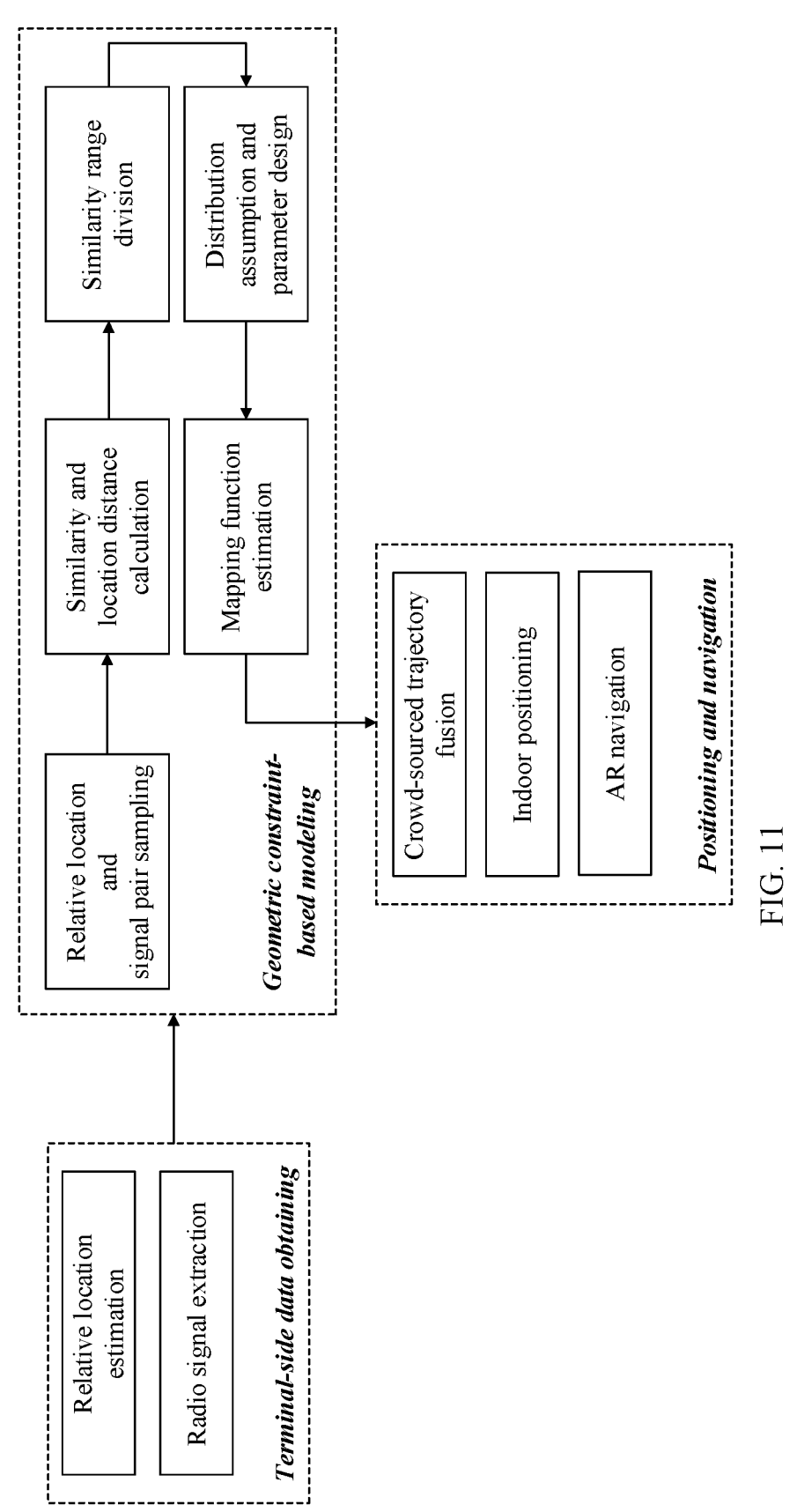
FIG. 11 is a schematic diagram of a software architecture according to an embodiment of this application.

FIG. 11 is a diagram of a system architecture according to an embodiment of this application. Specifically, data on a terminal side may be first obtained. Specifically, data information that may include, for example, data collected by a sensor, for example, an IMU or a visual-inertial odometry and that is used to estimate a relative location of a user; and a radio signal in a space, for example, from Wi-Fi, Bluetooth, or a mobile base station may be obtained from an intelligent mobile terminal. Then, geometric constraint-based modeling is performed. Specifically, a mapping relationship between a radio signal and a geometric constraint may be adaptively estimated based on trajectory data (including a relative location and radio signal information) obtained from different terminals. Then, positioning and navigation may be performed. Specifically, according to a model that is built based on the radio signal and the geometric constraint, crowd-sourced trajectories are fused to build an indoor radio signal-based model, and a low-cost and highly available indoor positioning service and an AR-related function augmented by the radio signal are implemented.

Figure 12:
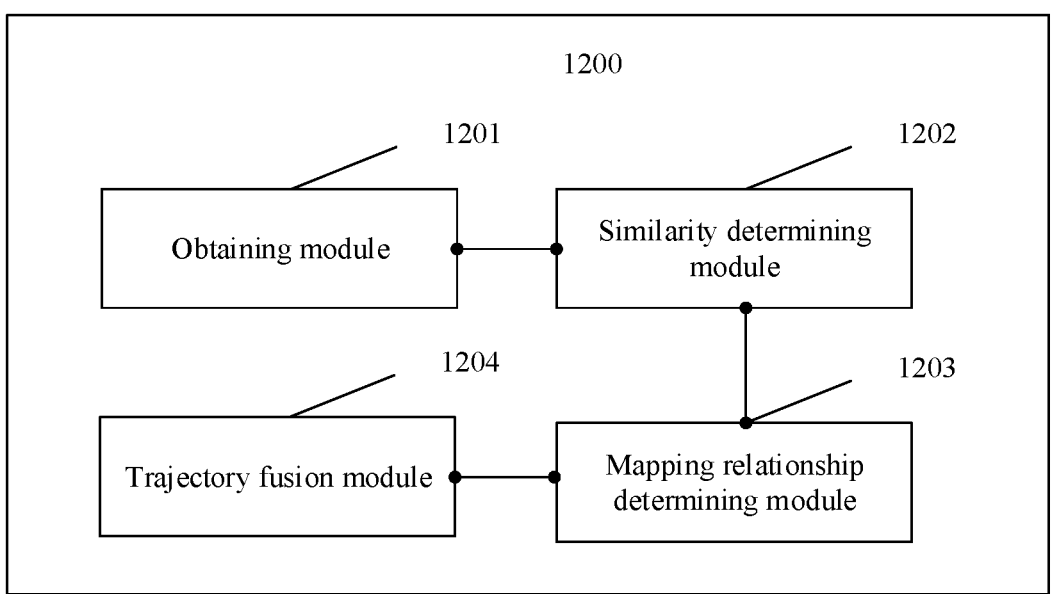
FIG. 12 is a schematic diagram of a structure of a data processing apparatus according to an embodiment of this application.

FIG. 12 is a schematic diagram of a data processing apparatus 1200 according to an embodiment of this application. As shown in FIG. 12, the data processing apparatus 1200 provided in this application includes: an obtaining module 1201, configured to obtain crowd-sourced data, where each instance of the crowd-sourced data includes first location information of a terminal at a location point and received radio signal information, the location point is within a preset area, and the first location information indicates a relative location of the location point with respect to a preset location point, where a detailed description of the obtaining module 1201 is provided with reference to the description in step 301, and details are not described herein again; a similarity determining module 1202, configured to obtain, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data, where a detailed description of the similarity determining module 1202 is provided with reference to the description in step 302, and details are not described herein again; a mapping relationship determining module 1203, configured to determine a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship, where a detailed description of the mapping relationship determining module 1203 is provided with reference to the description in step 303, and details are not described herein again; and a trajectory fusion module 1204, configured to: obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area.

A detailed description of the trajectory fusion module 1204 is provided with reference to the description in step 304, and details are not described herein again.

In a possible implementation, the crowd-sourced data are data of a location point on a same terminal motion trajectory.

In a possible implementation, the plurality of first similarities are distributed in M similarity ranges, each similarity range includes a plurality of first similarities, second similarities corresponding to the plurality of first similarities in each similarity range satisfy a Rayleigh distribution, and the mapping relationship determining module is configured to:

obtain a Rayleigh distribution parameter of the Rayleigh distribution satisfied by the second similarities corresponding to the plurality of first similarities in each of the M similarity ranges, where the Rayleigh distribution parameter indicates a maximum likelihood estimation result of the second similarities corresponding to the plurality of first similarities in the similarity ranges; and determine the target mapping relationship based on the M Rayleigh distribution parameters through a continuous function estimation.

In a possible implementation, the Rayleigh distribution parameter is obtained according to the following formula:

$$\hat{\sigma} = \sqrt{\frac{1}{n}\Sigma_i d_i^2 / 2}$$

$\hat{\sigma}$ represents the Rayleigh distribution parameter, $d_i$ represents the second similarity, and n represents a quantity of the first similarities included in each similarity range.

In a possible implementation, the mapping relationship determining module is configured to:

determine, based on the M Rayleigh distribution parameters, an estimated geometric distance in a similarity range corresponding to each Rayleigh distribution parameter; and determine, through continuous function estimation, the target mapping relationship based on M estimated geometric distances and a similarity range corresponding to each estimated geometric distance.

In a possible implementation, the radio signal information includes an identifier of a radio signal source transmitting a radio signal and signal strength information of the radio signal, and the second similarity includes a similarity of identifiers of radio signal sources transmitting radio signals and a similarity of signal strength information of the radio signals.

In a possible implementation, the first similarity is obtained according to the following formula:

$$g(O_i, O_j) = \frac{(1 + \beta^2)g_1(O_i, O_j)g_2(O_i, O_j)}{\beta^2 g_1(O_i, O_j) + g_2(O_i, O_j)}$$

$\beta$ is a weight of a preset value, $g_1(O_i, O_j)$ is used to represent the similarity of the identifiers of the radio signal sources transmitting the radio signals, and $g_2(O_i, O_j)$ is used to represent the similarity of the signal strength information of the radio signals.

In a possible implementation, the apparatus further includes:

a positioning module, configured to: obtain first radio signal information of a terminal device within the preset area; and determine location information of the terminal device based on the first radio signal information and the trajectory fusion result, where the first radio signal information is most similar to target radio signal information in the trajectory fusion result, and in the trajectory fusion result, the target radio signal information corresponds to the location information of the terminal device.

An embodiment of this application provides a data processing apparatus. The apparatus includes: an obtaining module, configured to obtain crowd-sourced data, where each instance of the crowd-sourced data includes first location information of a terminal at a location point and received radio signal information, the location point is within a preset area, and the first location information indicates a relative location of the location point with respect to a preset location point; a similarity determining module, configured to obtain, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data; a mapping relationship determining module, configured to determine a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship; and a trajectory fusion module, configured to: obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area. The crowd-sourced data is combined to create relative location-signal pairs, and a geometric constraint (that is, the target mapping relationship in this embodiment) is built based on the relative location information and the radio signal information, so that a radio signal-based model (that is, the trajectory fusion result in this embodiment) can be determined based on the crowd-sourced data without relying on absolute location information, thereby improving positioning precision of the radio signal-based model.

A data processing apparatus according to an embodiment of this application is described below. FIG. 13 is a schematic diagram of a structure of a data processing apparatus according to an embodiment of this application. The data processing apparatus 1300 may be specifically represented as a mobile phone, a tablet, a laptop computer, an intelligent wearable device, a server, or the like. This is not limited herein. The data processing apparatus described in the embodiment corresponding to FIG. 12 may be deployed on the data processing apparatus 1300 and configured to implement a data processing function in the embodiment corresponding to FIG. 12. Specifically, the data processing apparatus 1300 includes a receiver 1301, a transmitter 1302, a processor 1303, and a memory 1304 (there may be one or more processors 1303 in the data processing apparatus 1300, and one processor is used as an example in FIG. 13). The processor 1303 may include an application processor 13031 and a communication processor 13032. In some embodiments of this application, the receiver 1301, the transmitter 1302, the processor 1303, and the memory 1304 may be connected through a bus or in another manner.

The memory 1304 may include a read-only memory and a random access memory and provide instructions and data for the processor 1303. A part of the memory 1304 may further include a non-volatile random access memory (NVRAM). The memory 1304 stores a processor and operation instructions, an executable module or a data structure, a subset thereof, or an extended set thereof. The operation instructions may include various operation instructions for implementing various operations.

The processor 1303 controls an operation of an execution device. In a specific application, components of the execution device are coupled to each other by using a bus system. In addition to a data bus, the bus system may further include a power bus, a control bus, a status signal bus, and the like. However, for clearer description, various types of buses in the figure are referred to as the bus system.

The method disclosed in the foregoing embodiments of this application may be applied to the processor 1303, or may be implemented by using the processor 1303. The processor 1303 may be an integrated circuit chip that has a signal processing capability. During implementation, the steps in the foregoing method may be implemented by using a hardware integrated logic circuit in the processor 1303 or instructions in the form of software. The processor 1303 may be a general-purpose processor, a digital signal processor (DSP), a microprocessor, or a microcontroller, and may further include an application-specific integrated circuit (ASIC), a field-programmable gate array (FPGA) or another programmable logic device, a discrete gate or transistor logic device, or a discrete hardware assembly. The processor 1303 may implement or perform the methods, steps, and logic block diagrams disclosed in embodiments of this application. The general-purpose processor may be a microprocessor, or the processor may be any conventional processor or the like. The steps in the method disclosed with reference to embodiments of this application may be directly presented as being performed and completed by a hardware decoding processor, or performed and completed by a combination of hardware and software modules in a decoding processor. The software module may be located in a suitable storage medium in the art, for example, a random access memory, a flash memory, a read-only memory, a programmable read-only memory, an electrically erasable programmable memory, or a register. The storage medium is located in the memory 1304, and the processor 1303 reads information in the memory 1304 and completes the steps in the foregoing method in combination with hardware of the processor.

The receiver 1301 may be configured to: receive input digital or character information, and generate signal input related to a setting related to and function control of the execution device. The transmitter 1302 may be configured to output digital or character information through a first interface. The transmitter 1302 may be further configured to send an instruction to a disk pack through the first interface, to modify data in the disk pack. The transmitter 1302 may further include a display device, for example, a display screen.

In this embodiment of this application, in one case, the processor 1303 is configured to perform the data processing method performed by the server in the embodiment corresponding to FIG. 3.

Specifically, the processor 1303 is configured to: obtain crowd-sourced data, where each instance of the crowd-sourced data includes first location information of a terminal at a location point and received radio signal information, the location point is within a preset area, and the first location information indicates a relative location of the location point with respect to a preset location point;

obtain, based on the crowd-sourced data, a plurality of first similarities and a second similarity corresponding to each first similarity, where each first similarity is used to represent a signal similarity of radio signal information included in every two instances of the crowd-sourced data, and each second similarity is used to represent a location similarity of first location information included in every two instances of the crowd-sourced data;

determine a target mapping relationship based on the plurality of first similarities and the second similarity corresponding to each first similarity, where the target mapping relationship includes a mapping relationship between a location similarity of first location information corresponding to different locations of the terminal and the signal similarity of the received radio signal information, and a level of uncertainty of the mapping relationship; and obtain a plurality of preset trajectories within the preset area, and perform trajectory fusion on the plurality of preset trajectories with the target mapping relationship as a constraint, to obtain a trajectory fusion result, where the trajectory fusion result includes second location information of a plurality of location points within the preset area and radio signal information, and the second location information indicates absolute locations of the location points within the preset area.

In a possible implementation, the crowd-sourced data are data of a location point on a same terminal motion trajectory.

In a possible implementation, the plurality of first similarities are distributed in M similarity ranges. Each similarity range includes a plurality of first similarities, and second similarities corresponding to the plurality of first similarities in each similarity range satisfy a Rayleigh distribution. Specifically, the processor 1303 is configured to: obtain a Rayleigh distribution parameter of the Rayleigh distribution satisfied by the second similarities corresponding to the plurality of first similarities in each of the M similarity ranges. The Rayleigh distribution parameter indicates a maximum likelihood estimation result of the second similarities corresponding to the plurality of first similarities in the similarity ranges; and determine the target mapping relationship based on M Rayleigh distribution parameters through continuous function estimation.

In a possible implementation, the Rayleigh distribution parameter is obtained according to the following formula:

$$\hat{\sigma} = \sqrt{\frac{1}{n}\Sigma_i d_i^2 / 2}$$

$\hat{\sigma}$ represents the Rayleigh distribution parameter, $d_i$ represents the second similarity, and n represents a quantity of the first similarities included in each similarity range.

In a possible implementation, specifically, the processor 1303 is configured to: determine, based on the M Rayleigh distribution parameters, an estimated geometric distance in a similarity range corresponding to each Rayleigh distribution parameter; and determine, through continuous function estimation, the target mapping relationship based on M estimated geometric distances and a similarity range corresponding to each estimated geometric distance.

In a possible implementation, the radio signal information includes an identifier of a radio signal source transmitting a radio signal and signal strength information of the radio signal, and the second similarity includes a similarity of identifiers of radio signal sources transmitting radio signals and a similarity of signal strength information of the radio signals.

In a possible implementation, the first similarity is obtained according to the following formula:

$$g(O_i, O_j) = \frac{(1 + \beta^2)g_1(O_i, O_j)g_2(O_i, O_j)}{\beta^2 g_1(O_i, O_j) + g_2(O_i, O_j)}$$

$\beta$ is a weight of a preset value, $g_1(O_i, O_j)$ is used to represent the similarity of the identifiers of the radio signal sources transmitting the radio signals, and $g_2(O_i, O_j)$ is used to represent the similarity of the signal strength information of the radio signals.

In a possible implementation, specifically, the processor 1303 is configured to: obtain first radio signal information of a terminal device within the preset area; and determine location information of the terminal device based on the first radio signal information and the trajectory fusion result, where the first radio signal information is most similar to target radio signal information in the trajectory fusion result, and in the trajectory fusion result, the target radio signal information corresponds to the location information of the terminal device.

An embodiment of this application further provides a computer program product. When the computer program product runs on a computer, the computer is enabled to perform steps performed by the foregoing data processing apparatus.

An embodiment of this application further provides a computer-readable storage medium. The computer-readable storage medium stores a program used for signal processing. When the program is run on a computer, the computer is enabled to perform steps performed by the foregoing data processing apparatus.

Specifically, the data processing apparatus provided in embodiments of this application may be a chip. The chip includes a processing unit and a communication unit. The processing unit may be, for example, a processor, and the communication unit may be, for example, an input/output interface, a pin, or a circuit. The processing unit may execute computer-executable instructions stored in a storage unit, so that a chip in an execution device performs the data processing method described in the foregoing embodiments, or a chip in a training device performs the data processing method described in the foregoing embodiments. Optionally, the storage unit is a storage unit in the chip, for example, a register or a cache. The storage unit may alternatively be a storage unit that is in a wireless access device and that is outside the chip, for example, a read-only memory (ROM) or another type of static storage device that can store static information and instructions, or a random access memory (RAM).

Figure 14:
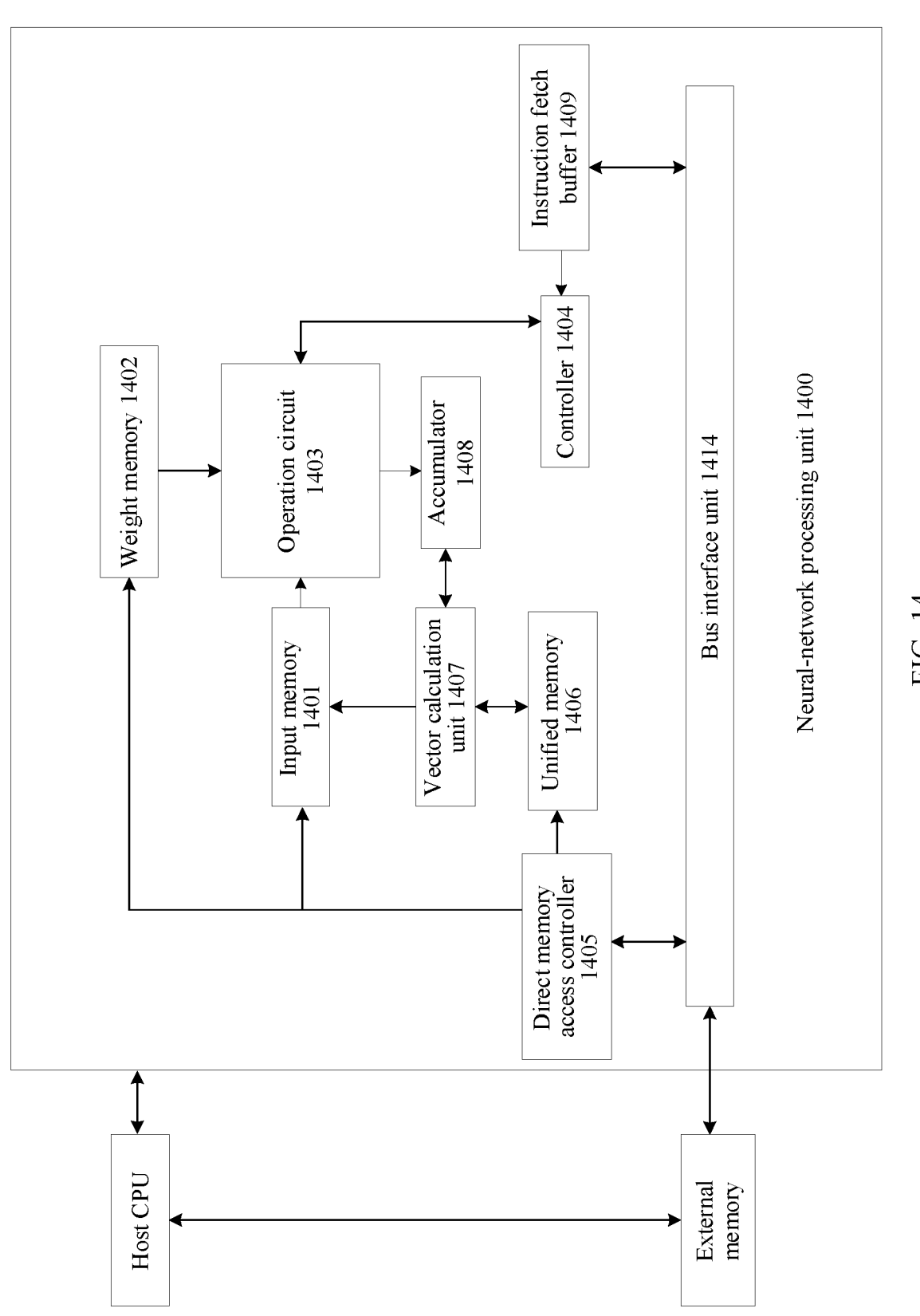
FIG. 14 is a schematic diagram of a structure of a chip according to an embodiment of this application.

Specifically, FIG. 14 is a schematic diagram of a structure of a chip according to an embodiment of this application. The chip may be represented as a neural-network processing unit NPU 1400. The NPU 1400 is mounted onto a host CPU as a coprocessor, and a task is allocated by the host CPU. A core part of the NPU is an operation circuit 1403, and a controller 1404 is configured to control the operation circuit 1403 to extract matrix data in a memory for a multiplication operation.

In some implementations, the operation circuit 1403 includes a plurality of process engines (PE). In some implementations, the operation circuit 1403 is a two-dimensional systolic array. The operation circuit 1403 may alternatively be a one-dimensional systolic array or another electronic circuit that can perform mathematical operations such as multiplication and addition. In some implementations, the operation circuit 1403 is a general-purpose matrix processor.

For example, it is assumed that there is an input matrix A, a weight matrix B, and an output matrix C. The operation circuit obtains data corresponding to the matrix B from a weight memory 1402, and caches the data in each PE of the operation circuit. The operation circuit obtains data corresponding to the matrix A from an input memory 1401, to perform a matrix operation with the matrix B, and stores an obtained partial result or final result of a matrix in an accumulator 1408.

A unified memory 1406 is configured to store input data and output data. Weight data is directly transferred to the weight memory 1402 by using a direct memory access controller (DMAC) 1405. The input data is transferred to the unified memory 1406 also by using the DMAC.

A BIU refers to a bus interface unit, that is, a bus interface unit 1414, configured for interaction between an AXI bus and the DMAC, and an instruction fetch buffer (IFB) 1409.

The bus interface unit (BIU) 1414 is used by the instruction fetch buffer 1409 to obtain an instruction from an external memory, and is further used by the direct memory access controller 1405 to obtain original data of the input matrix A or the weight matrix B from the external memory.

The DMAC is configured to: transfer input data in the DDR external memory to the unified memory 1406, transfer the weight data to the weight memory 1402, or transfer the input data to the input memory 1401.

A vector calculation unit 1407 includes a plurality of operation processing units. If needed, further processing, for example, vector multiplication, vector addition, an exponent operation, a logarithm operation, or size comparison, is performed on an output of the operation circuit 1403. The vector calculation unit 1407 is mainly configured to perform network calculation at a non-convolutional/fully connected layer of a neural network, for example, batch normalization, pixel-level summation, and upsampling a feature map.

In some implementations, the vector calculation unit 1407 can store a processed output vector in the unified memory 1406. For example, the vector calculation unit 1407 may apply a linear function or a nonlinear function to the output of the operation circuit 1403, for example, perform linear interpolation on a feature map extracted from a convolutional layer, and for another example, obtain a vector of an accumulated value to generate an activation value. In some implementations, the vector calculation unit 1407 generates a normalized value, a value of a pixel-level sum, or both. In some implementations, the processed output vector can be used as an activation input to the operation circuit 1403, for example, used in a subsequent layer of the neural network.

The instruction fetch buffer 1409 connected to the controller 1404 is configured to store an instruction used by the controller 1404.

The unified memory 1406, the input memory 1401, the weight memory 1402, and the instruction fetch buffer 1409 are all on-chip memories. The external memory is private to a hardware architecture of the NPU.

Any processor mentioned above may be a general-purpose central processing unit, a microprocessor, an ASIC, or one or more integrated circuits for controlling the program execution.

In addition, it should be noted that the apparatus embodiments described above are merely an example. The units described as separate parts may or may not be physically separate, and parts displayed as units may or may not be physical units, and may have one location, or may be distributed over a plurality of network units. All or some of the modules may be selected as actually required to achieve the objectives of the solutions of embodiments. In addition, in the accompanying drawings corresponding to the apparatus embodiments provided in this application, a connection relationship between modules indicates that the modules have a communication connection that may be specifically implemented through one or more communication buses or signal wires.

Based on the descriptions in the foregoing implementations, a person skilled in the art can clearly understand that this application may be implemented by using software in addition to necessary general-purpose hardware, or by using special-purpose hardware, including an application-specific integrated circuit, a dedicated CPU, a dedicated memory, a dedicated element or component, and the like. Usually, any function implemented by using a computer program can be easily implemented by using corresponding hardware. In addition, there may be various types of specific hardware structures used to implement a same function, for example, an analog circuit, a digital circuit, or a dedicated circuit. However, for this application, an implementation of a software program is a better implementation in most cases. Based on such an understanding, the technical solutions of this application essentially, or the part contributing to a current technology may be implemented in a form of a software product. The computer software product is stored in a readable storage medium, for example, a floppy disk, a USB flash drive, a removable hard disk, an ROM, a RAM, a magnetic disk, or an optical disc on a computer, and includes several instructions for instructing a computer device (that may be a personal computer, a training device, or a network device) to perform the method described in embodiments of this application.

All or some of the foregoing embodiments may be implemented by using software, hardware, firmware, or any combination thereof. When software is used for implementation, all or some of embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, training device, or data center to another website, computer, training device, or data center in a wired (for example, using a coaxial cable, an optical fiber, or a digital subscriber line (DSL)) or wireless (for example, via infrared, radio, or microwaves) manner. The computer-readable storage medium may be any usable medium accessible by the computer, or a data storage device, for example, a training device or a data center, integrating one or more usable media. The usable medium may be a magnetic medium (for example, a floppy disk, a hard disk, or a magnetic tape), an optical medium (for example, a DVD), a semiconductor medium (for example, a solid-state drive, Solid-State Drive (SSD)), or the like.

What is claimed is:

1. A data processing method comprising:
obtaining crowd-sourced data, wherein each instance of the crowd-sourced data comprises first location information of a terminal at a location point and received radio signal information, wherein the location point is within a preset area, and the first location information indicates a relative position of the location point with respect to a preset location point;
obtaining, based on the crowd-sourced data, a plurality of first similarities and a second similarity corresponding to each first similarity, wherein each first similarity is used to represent a signal similarity of radio signal information comprised in every two instances of the crowd-sourced data, and each second similarity is used to represent a location similarity of the first location information comprised in every two instances of the crowd-sourced data;
determining a target mapping relationship based on the plurality of first similarities and the second similarity corresponding to each first similarity, wherein the target mapping relationship comprises a first mapping relationship between a location similarity of the first location information corresponding to different locations of the terminal and the signal similarity of the received radio signal information, and a level of uncertainty of the first mapping relationship; and
obtaining a plurality of preset trajectories within the preset area, and performing trajectory fusion on the plurality of preset trajectories with the target mapping relationship as a constraint, to obtain a trajectory fusion result, wherein the trajectory fusion result comprises second location information of a plurality of location points within the preset area and radio signal information, and the second location information indicates absolute positions of the location points within the preset area.

2. The method according to claim 1, wherein the crowd-sourced data includes data of a location point on a same terminal motion trajectory.

3. The method according to claim 1, wherein the plurality of first similarities are distributed in M similarity ranges, each similarity range comprises a plurality of first similarities, second similarities corresponding to the plurality of first similarities in each similarity range satisfy a Rayleigh distribution, and determining the target mapping relationship comprises:
obtaining a Rayleigh distribution parameter of the Rayleigh distribution satisfied by the second similarities corresponding to the plurality of first similarities in each of the M similarity ranges, wherein the Rayleigh distribution parameter indicates a maximum likelihood estimation result of the second similarities corresponding to the plurality of first similarities in the similarity ranges; and
determining the target mapping relationship based on the M Rayleigh distribution parameters through continuous function estimation.

4. The method according to claim 3, wherein the Rayleigh distribution parameter is obtained according to the following formula:

$$\hat{\sigma} = \sqrt{\frac{1}{n}\Sigma_i d_i^2 / 2},$$

wherein
$\hat{\sigma}$ represents the Rayleigh distribution parameter, $d_i$ represents the second similarity, and n represents a quantity of the first similarities comprised in each similarity range.

5. The method according to claim 3, wherein determining the target mapping relationship based on the M Rayleigh distribution parameters through continuous function estimation comprises:
determining, based on the M Rayleigh distribution parameters, an estimated geometric distance in a similarity range corresponding to each Rayleigh distribution parameter; and
determining, through continuous function estimation, the target mapping relationship based on M estimated geometric distances and a similarity range corresponding to each estimated geometric distance.

6. The method according to claim 1, wherein the radio signal information comprises an identifier of a radio signal source transmitting a radio signal and signal strength information of the radio signal, and the first similarity comprises a similarity of identifiers of radio signal sources transmitting radio signals and a similarity of signal strength information of the radio signals.

7. The method according to claim 6, wherein the first similarity is obtained according to the following formula:

$$g(O_i, O_j) = \frac{(1 + \beta^2)g_1(O_i, O_j)g_2(O_i, O_j)}{\beta^2 g_1(O_i, O_j) + g_2(O_i, O_j)},$$

wherein

β is a weight of a preset value, $g_1(O_i,O_j)$ is used to represent the similarity of the identifiers of the radio signal sources transmitting the radio signals, and $g_2(O_i, O_j)$ is used to represent the similarity of the signal strength information of the radio signals.

8. The method according to claim 1, wherein the method further comprises:

obtaining first radio signal information of a terminal device within the preset area; and determining location information of the terminal device based on the first radio signal information and the trajectory fusion result, wherein the first radio signal information is most similar to target radio signal information in the trajectory fusion result, and in the trajectory fusion result, the target radio signal information corresponds to the location information of the terminal device.

9. A data processing system, wherein the system comprises:

at least one processor; and at least one memory coupled to the at least one processor to store program instructions, which when executed by the at least one processor, cause the at least one processor to:

obtain crowd-sourced data, wherein each instance of the crowd-sourced data comprises first location information of a terminal at a location point and received radio signal information, wherein the location point is within a preset area, and the first location information indicates a relative position of the location point with respect to a preset location point;

obtain, based on the crowd-sourced data, a plurality of first similarities and a second similarity corresponding to each first similarity, wherein each first similarity is used to represent a signal similarity of radio signal information comprised in every two instances of the crowd-sourced data, and each second similarity is used to represent a location similarity of the first location information comprised in every two pieces of the crowd-sourced data;

determine a target mapping relationship based on the plurality of first similarities and the second similarity corresponding to each first similarity, wherein the target mapping relationship comprises a first mapping relationship between a location similarity of the first location information corresponding to different locations of the terminal and the signal similarity of the received radio signal information, and a level of uncertainty of the first mapping relationship; and obtain a plurality of preset trajectories within the preset area, and performing trajectory fusion on the plurality of preset trajectories with the target mapping relationship as a constraint, to obtain a trajectory fusion result, wherein the trajectory fusion result comprises second location information of a plurality of location points within the preset area and radio signal information, and the second location information indicates absolute positions of the location points within the preset area.

10. The system according to claim 9, wherein the crowd-sourced data includes data of a location point on a same terminal motion trajectory.

11. The system according to claim 9, wherein the plurality of first similarities are distributed in M similarity ranges, each similarity range comprises a plurality of first similarities, second similarities corresponding to the plurality of first similarities in each similarity range satisfy a Rayleigh distribution, and wherein the program instructions, when executed by the one or more processors, cause the at least one processor to further determine the target mapping relationship by:

obtaining a Rayleigh distribution parameter of the Rayleigh distribution satisfied by the second similarities corresponding to the plurality of first similarities in each of the M similarity ranges, wherein the Rayleigh distribution parameter indicates a maximum likelihood estimation result of the second similarities corresponding to the plurality of first similarities in the similarity ranges; and determining the target mapping relationship based on the M Rayleigh distribution parameters through continuous function estimation.

12. The system according to claim 11, wherein the Rayleigh distribution parameter is obtained according to the following formula:

$$\hat{\sigma} = \sqrt{\frac{1}{n}\Sigma_i d_i^2 / 2}$$

wherein $\hat{\sigma}$ represents the Rayleigh distribution parameter, $d_i$ represents the second similarity, and n represents a quantity of the first similarities comprised in each similarity range.

13. The system according to claim 11, wherein determining the target mapping relationship comprises:

determining, based on the M Rayleigh distribution parameters, an estimated geometric distance in a similarity range corresponding to each Rayleigh distribution parameter; and determining, through continuous function estimation, the target mapping relationship based on M estimated geometric distances and a similarity range corresponding to each estimated geometric distance.

14. The system according to claim 9, wherein the radio signal information comprises an identifier of a radio signal source transmitting a radio signal and signal strength information of the radio signal, and the first similarity comprises a similarity of identifiers of radio signal sources transmitting radio signals and a similarity of signal strength information of the radio signals.

15. A non-transitory computer-readable storage medium, storing one or more instructions that, when executed by at least one processor, cause the at least one processor to:

obtain crowd-sourced data, wherein each instance of the crowd-sourced data comprises first location information of a terminal at a location point and received radio signal information, wherein the location point is within a preset area, and the first location information indicates a relative position of the location point with respect to a preset location point;

obtain, based on the crowd-sourced data, a plurality of first similarities and a second similarity corresponding to each first similarity, wherein each first similarity is used to represent a signal similarity of radio signal information comprised in every two instances of the crowd-sourced data, and each second similarity is used to represent a location similarity of first location information comprised in every two instances of the crowd-sourced data;

determine a target mapping relationship based on the plurality of first similarities and the second similarity corresponding to each first similarity, wherein the target mapping relationship comprises a first mapping relationship between a location similarity of the first location information corresponding to different locations of the terminal and the signal similarity of the received radio signal information, and a level of uncertainty of the first mapping relationship; and obtain a plurality of preset trajectories within the preset area, and performing trajectory fusion on the plurality of preset trajectories with the target mapping relationship as a constraint, to obtain a trajectory fusion result, wherein the trajectory fusion result comprises second location information of a plurality of location points within the preset area and radio signal information, and the second location information indicates absolute positions of the location points within the preset area.

16. The non-transitory computer-readable storage medium according to claim 15, wherein the crowd-sourced data includes data of a location point on a same terminal motion trajectory.

17. The non-transitory computer-readable storage medium according to claim 15, wherein the plurality of first similarities are distributed in M similarity ranges, each similarity range comprises a plurality of first similarities, second similarities corresponding to the plurality of first similarities in each similarity range satisfy a Rayleigh distribution, and the one or more instructions, when executed by the at least one processor, cause the at least one processor to determine the target mapping relationship by:

obtaining a Rayleigh distribution parameter of the Rayleigh distribution satisfied by the second similarities corresponding to the plurality of first similarities in each of the M similarity ranges, wherein the Rayleigh distribution parameter indicates a maximum likelihood estimation result of the second similarities corresponding to the plurality of first similarities in the similarity ranges; and determining the target mapping relationship based on M Rayleigh distribution parameters through continuous function estimation.

18. The non-transitory computer-readable storage medium according to claim 17, wherein the one or more instructions, when executed by at least one processor, cause the at least one processor to obtain the Rayleigh distribution parameter according to the following formula:

$$\hat{\sigma} = \sqrt{\frac{1}{n}\Sigma_i d_i^2 / 2},$$

wherein $\hat{\sigma}$ represents the Rayleigh distribution parameter, $d_i$ represents the second similarity, and n represents a quantity of the first similarities comprised in each similarity range.

19. The non-transitory computer-readable storage medium according to claim 17, wherein the one or more instructions, when executed by the at least one processor, cause the at least one processor to determining the target mapping relationship by:

determining, based on the M Rayleigh distribution parameters, an estimated geometric distance in a similarity range corresponding to each Rayleigh distribution parameter; and determining, through continuous function estimation, the target mapping relationship based on M estimated geometric distances and a similarity range corresponding to each estimated geometric distance.

20. The non-transitory computer-readable storage medium according to claim 15, wherein the radio signal information comprises an identifier of a radio signal source transmitting a radio signal and signal strength information of the radio signal, and the first similarity comprises a similarity of identifiers of radio signal sources transmitting radio signals and a similarity of signal strength information of the radio signals.

* * * * *